United States Patent
Saarinen

(10) Patent No.: US 11,822,901 B2
(45) Date of Patent: Nov. 21, 2023

(54) CRYPTOGRAPHY USING A CRYPTOGRAPHIC STATE

(71) Applicant: PQShield Ltd, Oxford (GB)

(72) Inventor: Markku-Juhani Olavi Saarinen, Oxford (GB)

(73) Assignee: PQShield Ltd., Oxford (GB)

( * ) Notice: Subject to any disclaimer, the term of this patent is extended or adjusted under 35 U.S.C. 154(b) by 265 days.

(21) Appl. No.: 17/478,518

(22) Filed: Sep. 17, 2021

(65) Prior Publication Data

US 2022/0066741 A1 Mar. 3, 2022

Related U.S. Application Data

(63) Continuation of application No. PCT/GB2020/050683, filed on Mar. 17, 2020.

(30) Foreign Application Priority Data

Mar. 18, 2019 (GB) .................................... 1903674
Aug. 16, 2019 (GB) .................................... 1911804

(51) Int. Cl.
*G06F 21/00* (2013.01)
*G06F 7/58* (2006.01)
(Continued)

(52) U.S. Cl.
CPC .............. *G06F 7/584* (2013.01); *G06F 7/768* (2013.01); *G06F 9/30029* (2013.01);
(Continued)

(58) Field of Classification Search
CPC ...... G06F 7/584; G06F 7/768; G06F 9/30029; G06F 9/30032; G06F 21/602;
(Continued)

(56) References Cited

U.S. PATENT DOCUMENTS 3,911,330 A * 10/1975 Fletcher .................. G06F 7/582
380/46
8,194,855 B2 6/2012 Shantz et al.
(Continued)

FOREIGN PATENT DOCUMENTS

CN 103812643 A 5/2014
EP 1068565 A2 1/2001
(Continued)

OTHER PUBLICATIONS

Liang, W., and Long Jing. "A cryptographic algorithm based on Linear Feedback Shift Register." 2010 International Conference on Computer Application and System Modeling (ICCASM 2010). vol. 15. IEEE, 2010. (Year: 2010).*
(Continued)

*Primary Examiner* — Joseph P Hirl
*Assistant Examiner* — Ka Shan Choy
(74) *Attorney, Agent, or Firm* — EIP US LLP

(57) ABSTRACT

Cryptographic methods and systems are described. Certain examples relate to performing cryptographic operations by updating a cryptographic state. The methods and systems may be used to provide cryptographic functions such as hashing, encryption, decryption and random number generation. In one example, a non-linear feedback shift register or expander sequence is defined. The non-linear feedback shift register or expander sequence has a plurality of stages to receive the cryptographic state, wherein at least one of the plurality of stages is updated as a non-linear function of one or more other stages. In certain examples, a cryptographic state is updated over a plurality of rounds. Examples adapted for authenticated encryption and decryption, hashing, and number generation are described.

20 Claims, 16 Drawing Sheets

(51) Int. Cl.
    *G06F 7/76* (2006.01)
    *G06F 9/30* (2018.01)
    *G06F 21/60* (2013.01)
    *G06F 21/72* (2013.01)
    *H04L 9/06* (2006.01)

(52) U.S. Cl.
    CPc ........ *G06F 9/30032* (2013.01); *G06F 21/602* (2013.01); *G06F 21/72* (2013.01); *H04L 9/0631* (2013.01); *H04L 9/0643* (2013.01)

(58) Field of Classification Search
    CPC ........ G06F 21/72; G06F 21/60; G06F 21/606; G06F 21/64; H04L 9/0631; H04L 9/0643; H04L 9/0637; H04L 9/3236; H04L 9/50; H04L 2209/12; H04L 9/06; H04L 9/0869; H04L 9/3228; H04L 9/3242; H04L 63/0435; H04L 2209/046; H04L 2209/24
    See application file for complete search history.

(56) References Cited

U.S. PATENT DOCUMENTS

| | | | |
|---|---|---|---|
| 8,538,012 | B2 | 9/2013 | Dixon et al. |
| 9,772,845 | B2 | 9/2017 | Yap et al. |
| 10,038,550 | B2 | 7/2018 | Gopal et al. |
| 2002/0040429 | A1 | 4/2002 | Dowling |
| 2008/0019524 | A1 | 1/2008 | Kim et al. |
| 2009/0254718 | A1 | 10/2009 | Biscondi et al. |
| 2010/0115237 | A1 | 5/2010 | Brewer et al. |
| 2010/0128872 | A1 | 5/2010 | Cordery et al. |
| 2010/0146296 | A1 | 6/2010 | Kim et al. |
| 2010/0235417 | A1 | 9/2010 | Baek |
| 2012/0076293 | A1 | 3/2012 | Smith et al. |
| 2014/0095844 | A1 | 4/2014 | Gopal et al. |
| 2014/0189369 | A1* | 7/2014 | Wolrich ............ G06F 21/64 713/192 |
| 2014/0254792 | A1 | 9/2014 | Gammel et al. |
| 2016/0080143 | A1* | 3/2016 | Kindarji ............ H04L 9/0618 380/28 |
| 2017/0109162 | A1* | 4/2017 | Yap ............ H04L 9/0643 |
| 2018/0157489 | A1 | 6/2018 | Yap et al. |
| 2018/0212761 | A1 | 7/2018 | Bilgin et al. |

FOREIGN PATENT DOCUMENTS

| | | | | |
|---|---|---|---|---|
| JP | H03251890 | A | 11/1991 | |
| JP | H0697930 | A | 4/1994 | |
| KR | 1020190020988 | A | 3/2019 | |
| WO | 0176129 | A2 | 10/2001 | |
| WO | WO-03021863 | A1 * | 3/2003 | ........... H04L 9/0637 |
| WO | 2011123575 | A1 | 10/2011 | |
| WO | 2014136594 | A1 | 9/2014 | |

OTHER PUBLICATIONS

International Search Report and Written Opinion dated Nov. 7, 2022 for PCT Application No. PCT/GB2022/051829.
[FIPS 202] "SHA-3 Standard: Permutation-Based Hash and Extendable-Output Functions", National Institute of Standards and Technology (NIST), Aug. 2015, https://dx.doi.org/10.6028/NIST.FIPS.202.
Kelsey et al., [SP 800-185] "SHA-3 Derived Functions: cSHAKE, KMAC, TupleHash, and ParallelHash", National Institute of Standards and Technology (NIST), Dec. 2016, https://doi.org/10.6028/NIST.SP.800-185.
[NIST PQC] "Post-Quantum Cryptography: Round 2 Submissions", https://csrc.nist.gov/Projects/Post-Quantum-Cryptography/Round-2-Submissions, created Jan. 3, 2017.
[NIST LWC] "Lightweight Cryptography: Round 1 Candidates", https://csrc.nist.gov/Projects/Lightweight-Cryptography/Round-1-Candidates, created Jan. 3, 2017.
Dobraunig et al., [Ascon], "Ascon v1.2." Proposal to NIST LWC standardization effort, Mar. 2019, https://ascon.iaik.tugraz.at/files/asconv12-nist.pdf https://ascon.iaik.tugraz.at/.
Bertoni et al., [Farfalle] "Farfalle: parallel permutation-based cryptography." IACR Cryptology ePrint Archive: Report 2016/1188, Dec. 2016, https://eprint.iacr.org/2016/1188.
Bertoni et al. "KangarooTwelve: fast hashing based on Keccak-p." Proc. ACNS 2018, LNCS 10892, pp. 400-418, Springer, 2018. https://doi.org/10.1007/978-3-319-93387-0_21 https://keccak.team/files/KangarooTwelve.pdf.
Bertoni et al., [Keyak] "Caesar submission: Keyak v2." Keccak Team, Sep. 2016, https://keccak.team/keyak.html https://keccak.team/files/Keyakv2-doc2.2.pdf.
Waterman et al., [RISCV] "The RISC-V Instruction Set Manual (vols. 1 and 2)." RISC-V Foundation, Jun. 2019, https://riscv.org/specifications/.
Saarinen, Markku-Juhani O., [SNEIK] "SNEIKEN and SNEIKHA: The SNEIK Family of Lightweight Cryptographic Algorithms." Proposal to NIST LWC standardization effort, Mar. 2019, https://github.com/pqshield/sneik.
Baan et al., Round5: Compact and fast post-quantum public-key encryption. In PQCrypto 2019—The Tenth International Conference on Post-Quantum Cryptography. Chongqing, China, May 8-10, 2019, volume to appear of Lecture Notes in Computer Science. Springer, 2019. URL: https://eprint.iacr.org/2019/090.
Saarinen, Markku-Juhani O, "SNEIKEN and SNEIKHA Authenticated Encryption and Cryptographic Hashing (Preliminary version of Wednesday Mar. 6, 2019)", Mar. 6, 2019 (Mar. 6, 2019), pp. 1-14, XP055708838, Retrieved from the Internet: URL:https://github.com/PQShield/sneik/raw/6f038ecb0d0479f7c6aee0276e20942a88567f51/sheik_spec.pdf.
Bernstein, Daniel J., "Chacha, a variant of salsa20", 2008. URL: https://cr.yp.to/chacha/chacha-20080128.pdf.
Bos et al., "Fly, you fool! faster frodo for the ARM cortex-m4", IACR Cryptology ePrint Archive, 2018:1116, 2018. URL: https://eprint.iacr.org/2018/1116.
Bernstein et al., "Gimli : A cross-platform permutation" In Wieland Fischer and Naofumi Homma, editors, Crypto-graphic Hardware and Embedded Systems—CHES 2017—19th International Conference, Taipei, Taiwan, Sep. 25-28, 2017, Proceedings, vol. 10529 of Lecture Notes in Computer Science, pp. 299-320. Springer, 2017. doi:10.1007/978-3-319-66787-4\_15.
Beaulieu et al., "The SIMON and SPECK families of lightweight block ciphers" IACR Cryptology ePrint Archive, 2013:404, 2013. URL: https://eprint.iacr.org/2013/404.
Dobraunig et al., "Ascon v1.2. Submission to the CAESAR Competition", 2016. URL: https://competitions.cr.yp.to/round3/asconv12.pdf.
Daemen et al., "The design of xoodoo and xoofff" IACR Trans. Symmetric Cryptol., 2018(4):1-38, 2018. URL: https://doi.org/10.13154/tosc.v2018.i4.1-38, doi:10.13154/tosc.v2018.i4.1-38.
Gazi et al., "The exact PRF security of truncation: Tight bounds for keyed sponges and truncated CBC" In Rosario Gennaro and Matthew Robshaw, editors, Advances in Cryptology—Crypto 2015—35th Annual Cryptology Conference, Santa Barbara, CA, USA, Aug. 16-20, 2015, Proceedings, Part I, vol. 9215 of Lecture Notes in Computer Science, pp. 368-387. Springer, 2015. doi:10.1007/978-3-662-47989-6\_18.
Hamburg, Mike, The STROBE protocol framework. IACR Cryptology ePrint Archive, 2017:3, 2017. URL: http://eprint.iacr.org/2017/003.
Jovanovic et al., "Beyond 2 c/2 security in sponge-based authenticated encryption modes" In Palash Sarkar and Tetsu Iwata, editors, Advances in Cryptology—ASIACRYPT 2014—20th International Conference on the Theory and Application of Cryptology and Information Security, Kaoshiung, Taiwan, R.O.C., Dec. 7-11, 2014. Proceedings, Part I, vol. 8873 of Lecture Notes in Computer Science, pp. 85-104., Springer, 2014. doi:10.1007/978-3-662-45611-8\_5.
Khovratovich et al., "Rotational cryptanalysis of ARX" In Seokhie Hong and Tetsu Iwata, editors, Fast Software Encryption, 17th International Workshop, FSE 2010, Seoul, Korea, Feb. 7-10, 2010, Revised Selected Papers, vol. 6147 of Lecture Notes in Computer

(56) References Cited

OTHER PUBLICATIONS

Science, pp. 333-346. Springer, 2010. URL: https://doi.org/10.1007/978-3-642-13858-4_19, doi:10.1007/978-3-642-13858-4\_19.

Moriarty et al., PKCS #1: RSA cryptography specifications version 2.2. RFC, 8017:1-78, 2016. doi:10.17487/RFC8017.

Mennink et al., "Security of full-state keyed sponge and duplex: Applications to authenticated encryption" In Tetsu Iwata and Jung Hee Cheon, editors, Advances in Cryptology—ASIACRYPT 2015—21st International Conference on the Theory and Application of Cryptology and Information Security, Auckland, New Zealand, Nov. 29-Dec. 3, 2015, Proceedings, Part II, vol. 9453 of Lecture Notes in Computer Science, pp. 465-489. Springer, Berlin Heidelberg, 2015.

B. Poettering, "Avraes: The aes block cipher on avr controllers", 2007. URL: http://point-at-infinity.org/avraes/.

Saarinen, Markku-Juhani O. "Beyond modes: Building a secure record protocol from a cryptographic sponge permutation" In Benaloh [Ben14], pp. 270-285, doi:10.1007/978-3-319-04852-9\_14.

Saarinen, Markku-Juhani O. "CBEAM: efficient authenticated encryption from feebly one-way Φ functions". In Benaloh [Ben14], pp. 251-269. doi:10.1007/ 978-3-319-04852-9\_13.

Saarinen et al., "Whirlbob, the whirlpool based variant of STRIBOB" In Sonja Buchegger and Mads Dam, editors, Se-cure IT Systems, 20th Nordic Conference, NordSec 2015, Stockholm, Sweden, Oct. 19-21, 2015, Proceedings, vol. 9417 of Lecture Notes in Computer Science, pp. 106-122. Springer, 2015. doi:10.1007/978-3-319-26502-5\_8.

Schwabe et al., "All the AES you need on cortex-m3 and M4", In Roberto Avanzi and Howard M. Heys, editors, Selected Areas in Cryptog raphy—SAC 2016—23rd International Conference, St. John's, NL, Canada, Aug. 10-12, 2016, Revised Selected Papers, vol. 10532 of Lecture Notes in Computer Science, pp. 180-194. Springer, 2016. URL: https://doi.org/10.1007/978-3-319-69453-5_10, doi:10.1007/978-3-319-69453-5\_10.

Wheeler et al., Correction to xtea. Informal Manuscript or Report, 1998. URL: https://www.mjos.fi/doc/misc/xxtea.pdf.

Saarinen, Markku-Juhani O., "Beyond Modes: Building a Secure Record Protocol from a Cryptographic Sponge Permutation" Kudelski Security, Switzerland, mjos@cblnk.com.

Rotational Cryptanalysis of ARX Dmitry Khovratovich and Ivica Nikoli'c University of Luxembourg dmitry.khovratovich@uni.lu, ivica.nikolic@uni.lu.

International Search report and Written Opinion dated Oct. 22, 2020 for PCT Application No. PCT/GB2020/051699.

United Kingdom Combined Search and Examination report dated Sep. 19, 2019 for United Kingdom application No. GB1903674.8.

United Kingdom Combined Search and Examination report dated Jan. 21, 2020 for United Kingdom application No. GB1910372.0.

United Kingdom Search report dated Feb. 14, 2020 for United Kingdom application No. GB 1911804.1.

International Search report and Written Opinion dated Jul. 8, 2020 for PCT Application No. PCT/GB2020/050683.

[CC-PP-0084] "Security IC Platform Protection Profile with Augmentation Packages." Bundesamt für Sicherheit in der Informationstechnik (BSI) reference BSI-CC-PP-0084-2014.https://www.commoncriteriaportal.org/files/ppfiles/pp0084b_pdf.pdf Jan. 13, 2014.

[SOGIS-AVA] "Application of Attack Potential to Smartcards and Similar Devices." Version 3.1. (2020). https://www.sogis.eu/documents/cc/domains/sc/JIL-Application-of-Attack-Potential-to-Smartcards-v3-1.pdf Jun. 2020.

[SP800-193] "Platform Firmware Resiliency Guidelines." NIST SP 800-193. (2018). DOI: https://doi.org/10.6028/NIST.SP.800-193 May 2018.

[RFC8391] "XMSS: eXtended Merkle Signature Scheme." IETF RFC 8391 (2018). DOI: https://doi.org/10.17487/RFC8391 May 2018.

[RFC8554] "Leighton-Micali Hash-Based Signatures." IETF RFC 8554 (2018). DOI: https://doi.org/10.17487/RFC8554, Apr. 2018.

[PQFAQ] ""Post-Quantum Cryptography FAQs / Transition and Migration."" https://csrc.nist.gov/projects/post-quantum-cryptography/faqs Jan. 3, 2017.

[CoGrVa14] J. Coron, J. Großschädl, P. K. Vadnala. ""Secure Conversion Between Boolean and Arithmetic Masking of Any Order."" IACR-CHES (2014). http://www.crypto-uni.lu/jscoron/publications/secconvorder.pdf Sep. 23, 2014.

[Co17] J. Coron. "High-Order Conversion From Boolean to Arithmetic Masking." IACR-CHES (2017). https://eprint.iacr.org/2017/252 Sep. 25, 2017.

[GaGrMa+20] S. Gao, J. Großschädl, B. Marshall, D. Page, T. Pham, and F. Regazzoni."An Instruction Set Extension to Support Software-Based Masking." (2020) https://eprint.iacr.org/2020/773 Jun. 23, 2020.

[BeDaPe+10] G. Bertoni, J. Daemen, M. Peeters, and G. Van Assche. ""Building power analysis resistant implementations of Keccak."" SHA-3 Conference (2010) https://keccak.team/files/KeccakDPA.pdf Aug. 2010.

[NiRiSc11] S. Nikova, V. Rijmen, and M. Schlaffer. ""Secure Hardware Implementation of Nonlinear Functions in the Presence of Glitches."" J. Cryptol. 24, pp. 292-322 (2011). https://doi.org/10.1007/s00145-010-9085-7 Oct. 19, 2010.

[Sa18] M.-J. O. Saarinen. "Arithmetic Coding and Blinding Countermeasures for Lattice Signatures." J. Cryptogr. Eng. (2018) 8:71-84. http://rdcu.be/oHun https://eprint.iacr.org/2016/276 Jan. 21, 2017.

[BaBeEs+18] G. Barthe, S. Belaïd, T. Espitau, P.-A. Fouque, B. Grégoire, M. Rossi, and M. Tibouchi. "Masking the GLP Lattice-Based Signature Scheme at Any Order." IACR-EUROCRYPT (2018) https://eprint.iacr.org/2018/381 Apr. 26, 2018.

[BeAnKa+20] M. Van Beirendonck, J. D'Anvers, A. Karmakar, J. Balasch, and I. Verbauwhede."A Side-Channel Resistant Implementation of SABER." To appear in ACM JETC (2020). https://eprint.iacr.org/2020/733 Jun. 17, 2020.

[MiGeTi+19] V. Migliore, B. Gérard, M. Tibouchi, and P. Fouque. "Masking Dilithium: Efficient Implementation and Side-Channel Evaluation." ACNS (2019). https://eprint.iacr.org/2019/394 Apr. 14, 2019.

[RV-ISA] RISC-V International. "RISC-V Specifications." RISC-V International (2021). https://riscv.org/technical/specifications/.

[RV-CRYPTO] RISC-V International (Ben Marshall, Ed.) "RISC-V Cryptography Extension." RISC-V CETG (2021). https://github.com/riscv/riscv-crypto Feb. 19, 2020.

Ascon: A Family of Authenticated Encryption Algorithms, Jan. 2, 2019.

[FrVaRo+21] T. Fritzmann, M. Van Beirendonck, D. Basu Roy, P. Karl, T. Schamberger, I. Verbauwhede, and G. Sigl. "Masked Accelerators and Instruction Set Extensions for Post-Quantum Cryptography." Preprint (2021). https://eprint.iacr.org/2021/479 Apr. 15, 2021.

[RV-VECTOR] "Working draft of the proposed RISC-V V vector extension." RISC-V (2021). https://github.com/riscv/riscv-v-spec Jun. 13, 2019.

"Blitter Hardware" of the AMIGA Hardware Reference Manual. Addison-Wesley. 1985, Chapter 6.

"Crypto-processeur", pp. 1-190 URL: https://tel.archives-ouvertes.fr/tel-00978472/document sections 3 and 4, 2012.

* cited by examiner

900

910 — $t_1 = s[i-n] \oplus d[i]$ — 932

912 — $t_2 = t_1 \boxplus s[i-1]$ — 936
934

914 — $t_3 = t_2 \oplus (t_2 \lll 24) \oplus (t_2 \lll 25)$

916 — $t_4 = t_3 \oplus s[i-2]$

918 — $t_5 = t_4 \boxplus s[i-n+2]$

920 — $t_6 = t_5 \oplus (t_5 \lll 9) \oplus (t_5 \lll 17)$

922 — $t_7 = t_6 \oplus s[i-n+1]$

924 — $s[i] = t_7$

916' — $t_4' = t_3 \oplus (s[i-2] \lll 1)$

*Fig. 9A*

942      944 rc[0..15] = 0xEF, 0xE0, 0xD9, 0xD6, 0xBA, 0xB5, 0x8C, 0x83,
0x10, 0x1F, 0x26, 0x29, 0x45, 0x4A, 0x73, 0x7C

```
void perm512(void *s , uint8_t dom , uint8_t rounds)
{
    int i, j;
    uint32_t t, *v = ( uint32_t *) s;
    for (i = 0; i < rounds ; i++) {
        v[0] ^= ( uint32_t ) rc[i];
        v[1] ^= ( uint32_t ) dom;
        for (j = 0; j < 16; j++) {
            v[j] = F_WIN(
                v[j-2], v[j-1], v[j],
                v[j+1], v[j+2]);
        }
    }
}
```

```
t = v[j];                                    1010
t += v[( j - 1) & 0xF ];
t = t ^ ROL32(t, 24) ^ ROL32(t, 25);
t ^= v[( j - 2) & 0xF ];
t += v[( j + 2) & 0xF ];
t = t ^ ROL32(t, 9) ^ ROL32(t, 17);
t ^= v[( j + 1) & 0xF ];
v[j] = t;
```

*Fig. 10B*

```
t = v[j];                                    1011
t += v[( j - 1) & 0xF ];
t = t ^ ROL32(t, 24) ^ ROL32(t, 25);
t ^= ROL32(v[(j - 2) & 0xF], 1);
t += v[( j + 2) & 0xF ];
t = t ^ ROL32(t, 9) ^ ROL32(t, 17);
t ^= v[( j + 1) & 0xF ];
v[j] = t;
```

*Fig. 10C*

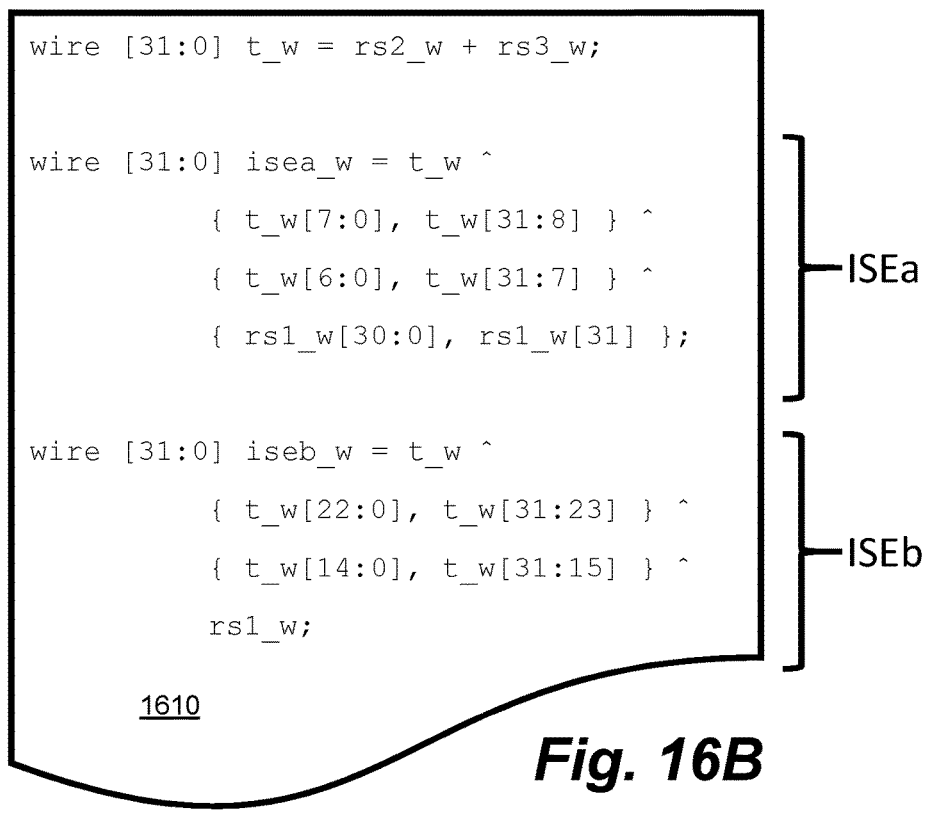
*Fig. 16A*
*Fig. 16B*
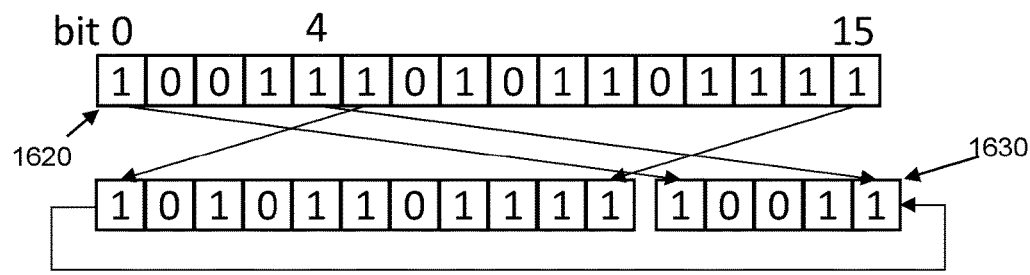
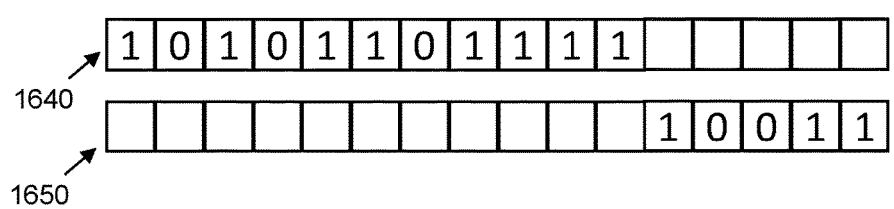
*Fig. 16C*

CRYPTOGRAPHY USING A CRYPTOGRAPHIC STATE

CROSS-REFERENCE TO RELATED APPLICATIONS

This application is a continuation of International Application No. PCT/GB2020/050683, filed Mar. 17, 2020, which claims priority to GB Application No. GB1903674.8, filed Mar. 18, 2019, and GB Application No. GB1911804.1, filed Aug. 16, 2019, under 35 U.S.C. § 119(a). Each of the above-referenced patent applications is incorporated by reference in its entirety.

BACKGROUND OF THE INVENTION

Technical Field

The present invention relates to cryptographic methods and systems. In particular, the present invention relates to performing cryptographic operations by updating a cryptographic state. The methods and systems may be used to provide cryptographic functions such as hashing, encryption, decryption and random number generation.

Background

Recently, there has been an explosion in the number of devices that are connected to computer networks. For example, Internet connectivity is expanding beyond computing devices such as desktop and laptop computers to embedded systems within everyday objects such as motor vehicles, lightbulbs, fridges, medical devices, thermostats and surveillance systems. Telecommunications links allow a large number of low-cost computing devices to report sensor data, and/or be controlled, across the world. One issue with these connected devices is that they are often vulnerable to attack and malicious control. For example, hundreds or thousands of embedded devices may be compromised by malicious parties and used to enact distributed denial of services attacks. In many cases, control of these devices is easily obtained due to poor or limited implementations of cryptographic protocols. As these connected devices grow in number and popularity, there is an open question as to how to secure them.

As an example, to perform an embedded firmware update on a connected device, it may be desired to simultaneously assure the confidentiality and authenticity of digital data that is transmitted for the update over one or more public networks. This may be achieved using authenticated encryption and decryption methods, such as authenticated encryption with associated data (AEAD) methods. In these methods, packet data such as a header containing a destination Internet Protocol (IP) address may be used as public associated data, where encryption of the digital data is cryptographically linked with the associated data. These methods may provide an improvement over block cipher methods, where it is difficult to securely combine confidentiality and authentication modes. For example, it has been possible to take advantage of certain block cipher decryption operations to "leak" information about an encryption operation or an encrypted set of data. This was found to be the case with early Secure Sockets Layer (SSL) and Internet Protocol Security (IPSec) implementations, where a padding validation operation was exploited to compromise encrypted data transmitted over the Internet.

Another consideration when securing a large number of connected computing devices is the possibility of a future attack using quantum computing. For many years, quantum computers were of mainly theoretical interest. However, research implementations of quantum computers are developing rapidly. Quantum computers having 50 and 72 qubits are currently available, and there are many research groups actively working on higher qubit machines. Given the possible future reality of quantum computing, recent work has shown that many well-known public key cryptographic systems can be broken by a sufficiently strong quantum computer.

It is thus desirable to provide cryptographic solutions that may be used within low-resource embedded systems, while being resistant to attack in a post-quantum environment.

SUMMARY

Aspects of the present invention are set out in the appended independent claims. Certain variations of the invention are then set out in the appended dependent claims.

BRIEF DESCRIPTION OF THE DRAWINGS

Examples of the invention will now be described, by way of example only, with reference to the accompanying drawings, in which:

FIG. 9A is an illustration of a set of computations for a non-linear feedback shift expander sequence for an example computing device;

FIG. 9B is an illustration of a set of round constants for an example apparatus;

FIGS. 10A, 10B and 10C are illustrated pseudo-code formulations showing cryptographic functions according to two examples;

FIG. 16A is an illustration of an instruction set;

FIG. 16B is a further pseudo code illustration; and

FIG. 16C is an illustration of equivalent cyclic rotate operations.

DETAILED DESCRIPTION

Figure 1:
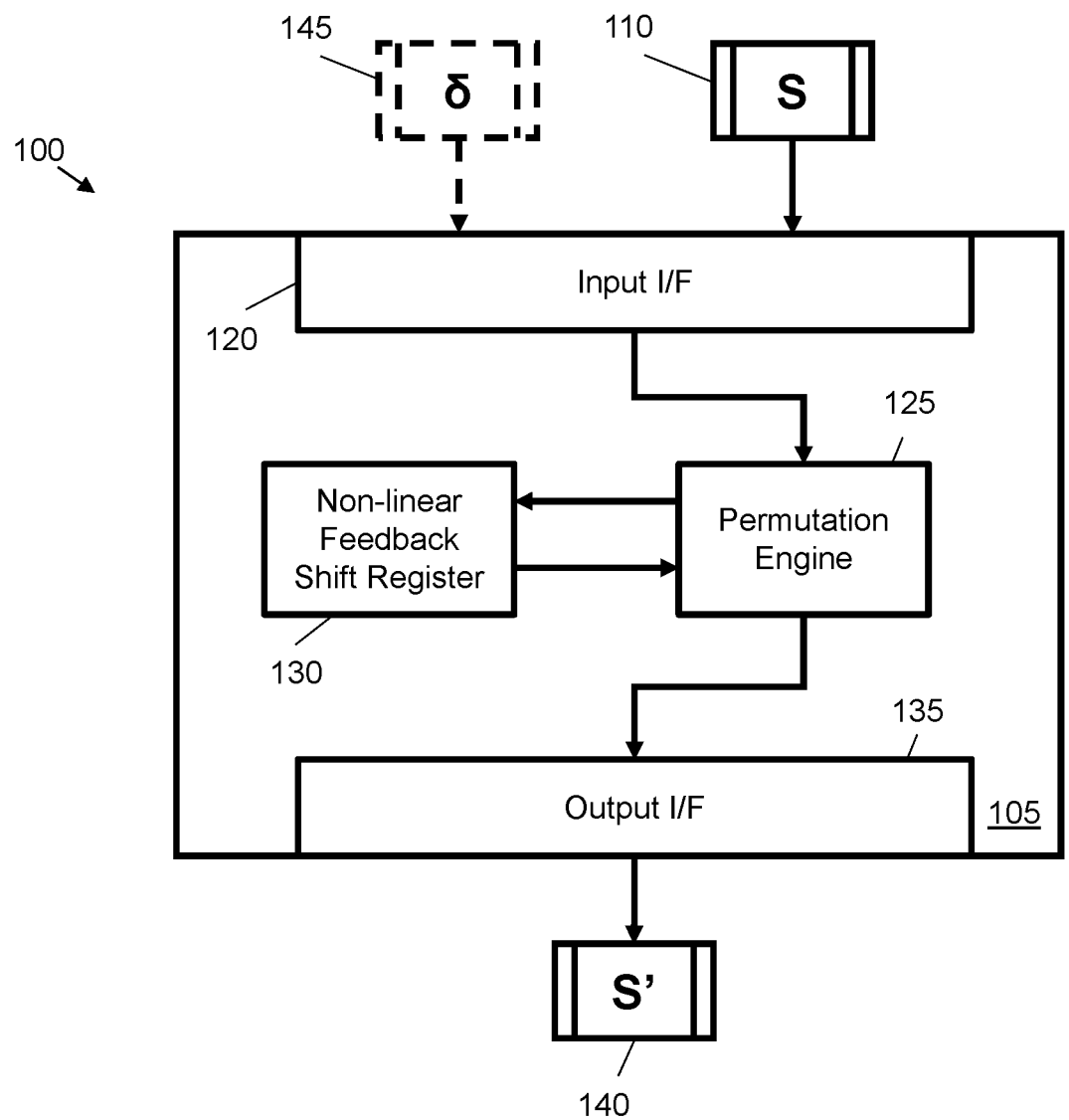
FIG. 1 is a schematic illustration showing an apparatus for permutating electronic data according to an example.

Certain examples described herein provide cryptographic methods that are suitable for implementation on low-resource microcontrollers and embedded devices. The examples involve operations that are performed on a cryptographic state. This cryptographic state may comprise a collection of bits, e.g. a sequence of 256 or 512 binary values. Certain examples described herein use a permutation operation to update the cryptographic state. The updating of the cryptographic state may then provide a framework for a variety of cryptographic functions, such as hashes, encryption and decryption functions and number generators.

It should be noted that reference to "permutation" applies to permutation as used in the cryptographic arts. There are several known cryptographic algorithms that are based on cryptographic permutation. Operations that use cryptographic permutation include sponge operations in cryptographic algorithms, such as "absorb" and "squeeze" operations. It is the cryptographic state that is permutated. For example, a cryptographic state may comprise a collection of bits that represents an integer. The permutation may comprise permutation within a set of integer values that may be defined by the bits. Hence, it is not the bits per se that are permutated but the values the bits represent (although permutation of the cryptographic state as represented by the bits may involve operations that act to shuffle or rearrange the bits).

In certain examples, a permutation operation is implemented using a custom non-linear feedback shift register that implements a corresponding non-linear feedback shift expander sequence. The non-linear feedback shift register receives the cryptographic state and implements a non-linear function to update at least a first portion of the cryptographic state. The non-linear function is a function of at least a second portion of the cryptographic state. Different portions of the cryptographic state may be updated. Permutation may be repeated over a series of "rounds" or iterations. In examples, the non-linear feedback shift register is described as "updating" a portion of the cryptographic state as a permutation of the cryptographic state may comprise multiple iterations (e.g. the aforementioned rounds) of different portions, whereby repeated application of the non-linear feedback shift register implements the permutation. The repeated application of the non-linear feedback shift register may be controlled by a permutation engine, as such the permutation engine performs the cryptographic permutation using the non-linear feedback shift register.

Certain examples described herein may be efficiently implemented on low-resource microcontrollers, such as 8-bit and 32-bit microcontrollers with limited read-only and/or random-access memories. The examples have a small implementation footprint while providing cryptographic security, and they are suitable for use in building post-quantum cryptographic schemes. Outside of low-resource microcontrollers, the examples are also scalable to computing devices with more resources. In these cases, the described examples may be easily configured to provide greater security without substantially reimplementing the cryptographic functions.

In certain examples and variations, an apparatus for permutating electronic data is provided. The apparatus may comprise: an input interface to receive at least a cryptographic state, the cryptographic state comprising a plurality of bits; a non-linear feedback shift register, the non-linear feedback shift register comprising a plurality of w-bit stages to receive the cryptographic state, the non-linear feedback shift register updating at least one of the plurality of stages as a non-linear function of at least one or more other stages in the plurality of stages using at least a cyclic rotation by r-bits of an w-bit data value; a permutation engine to apply the non-linear feedback shift register to the cryptographic state over a plurality of rounds to update the cryptographic state; and an output interface to output the cryptographic state as updated by the permutation engine over the plurality of rounds, wherein cyclic rotation by r-bits is performed by a combination of instructions comprising left shift, right shift and bit combination operations. As well as the cyclic rotation, an addition modulo w-bits between two w-bit data values and a bitwise exclusive-or operation between two w-bit data values may be used.

According to another example, a method of updating a cryptographic state is described. The method may comprise: obtaining a cryptographic state, the cryptographic state comprising a plurality of bits; for a predefined number of rounds: applying a round constant to the cryptographic state, the round constant being specific to a current round, and implementing a non-linear feedback shift expander sequence using the plurality of bits of the cryptographic state to update the cryptographic state for the current round, the cryptographic state following the non-linear feedback shift expander sequence being used as an input for a next round, the non-linear feedback shift register applying at least one addition operation, at least one exclusive-or operation and at least one cyclical rotate operation, the cyclic rotate operation implemented by instructions comprising a combination of left shift, right shift and bit combination operations, the operations being applied to subsets of the plurality of bits of the cryptographic state; and outputting the updated cryptographic state following the predefined number of rounds.

The apparatus and method in certain examples may deploy a RISC core. The RISC core may have a base instruction set with instructions for modulo addition and bitwise exclusive-or but without an instruction for cyclic rotations. In such a case, the ability to perform cyclic rotations, for implementing the non-linear feedback shift register, may benefit from instructions provided in an instruction set extension to the base instruction set. For example, the instruction set extension may provide instructions to perform cyclic rotations, such as cyclic left rotations, by a combination of left shift, right shift and bit combination (e.g. concatenation) operations. An exemplary RISC core which may benefit from such an approach may be the RISC-V core, and in particular, but not exclusively, by using the known RV32I (32 bit) hardware implementation thereof. Other implementations may be performed on 64-bit architectures, such as on the RISC-V RV64I.

FIG. 1 shows an example 100 of an apparatus 105 for permutating electronic data. The apparatus may comprise, amongst others, a programmed microcontroller, a System-On-Chip (SOC) implementation, an Application Specific Integrated Circuit (ASIC) and/or a set of configured Field Programmable Gate Arrays (FPGAs). The apparatus 105 may form whole or part of an embedded computing device, such as circuitry for a medical device, a domestic appliance or a motor vehicle. The apparatus 105 is configured to update a cryptographic state. The cryptographic state comprises a plurality of bits. The number of bits may be predefined or set as a configurable parameter of the apparatus 105. The number of bits may comprise a power of 2, e.g. $2^b$ bits where b is greater than 1. In certain cases, the number of bits may comprise 256, 512 or 1024 bits.

In FIG. 1, the apparatus comprises an input interface 120, a permutation engine 125, a non-linear feedback shift register 130 and an output interface 135. The apparatus 105 is configured to receive at least an initial cryptographic state 110 at the input interface 120 and output an updated cryptographic state 140 at the output interface 135. The initial cryptographic state 110 and the updated cryptographic state 140 are different temporal versions of the cryptographic state, i.e. where the state has different values. In one case, the input interface 120 may comprise a physical interface of the apparatus 105, e.g. one or more electrical couplings over which the apparatus may receive binary data implemented as one or more voltage and/or current levels. For example, the input interface 120 may comprise serial and/or parallel pin connections that are configured to receive electrical signals. In more complex microcontrollers, the input interface 120 may comprise one or more internal processor couplings. In certain cases, the input interface 120 may be defined within computer program code that is implemented by a processor, e.g. in the form of variables received by a function definition and/or an application programming interface.

In the example of FIG. 1, the permutation engine 125 of the apparatus 105 is configured to receive the initial cryptographic state 110 from the input interface 120 and to control the operation of the non-linear feedback shift register 130 to update the initial cryptographic state 110. The initial cryptographic state 110 is updated one or more times to generate the updated cryptographic state 140. The updated cryptographic state 140 comprises the same number of bits as the initial cryptographic state 110 but with one or more differing bit values. In the example of FIG. 1, the permutation engine 125 receives a modified version of the cryptographic state from the non-linear feedback shift register 130 and forwards this to the output interface 135 for supply as the updated cryptographic state 140. The output interface 135 may be of a similar form to the input interface 120. In one case, it may comprise a common interface (e.g. shared with the input interface 120). In certain microcontrollers, the output interface 135 may comprise one or more pins of the microcontroller. In other cases, the output interface 135 may comprise data as returned by a function defined in computer program code that is implemented by at least one processor (e.g. data that is loaded into a defined random-access memory location or set of registers).

In the example of FIG. 1, the non-linear feedback shift register 130 comprises a plurality of stages to receive a version of the cryptographic state. For example, each of the plurality of stages may be defined by data storage having a predefined width in bits. For example, each stage may comprise a sub-register of the non-linear feedback shift register 130. In one case, each stage may have a width equal to a data word as processed by the microcontroller. In another case, each stage may have a width of one or more bits or bytes. In general, the plurality of stages comprises a decomposition of the cryptographic state. For example, a 512-bit cryptographic state on a 32-bit microcontroller may be split into 16 words of 32-bits, and a 256-bit cryptographic state on an 8-bit microcontroller may be split into 32 words of 8-bits. In these cases, the plurality of stages may number 16 and 32 respectively. In one case, on receipt of a given version of the cryptographic state, the non-linear feedback shift register 130 copies the data for the state into each of the sub-registers. In general, each of the plurality of stages may have a width in bits that is determined based on a word length of the apparatus 105, the word-length in bits being less than the plurality of bits of the cryptographic state. A "word" in this context refers to a fixed-size unit of data that is associated with a unit of data that is processed by an instruction set and/or processor of the apparatus 105. For example, one or more of a memory, registers, a processor bus and/or internal circuitry may be designed to handle data of the fixed size. The word length of the apparatus 105 may, for example, be one of 8, 16, 24, 32 or 64 bits.

In the example of FIG. 1, the non-linear feedback shift register 130 updates at least one of the plurality of stages as a non-linear function of one or more other stages in the plurality of stages. For example, the non-linear feedback shift register 130 may indicate that a given one of the plurality of stages is to be updated. The non-linear feedback shift register 130 may then compute a function of one or more other stages in the plurality of stages and then use an output of the function to update the given one of the plurality of stages. In certain cases, an updated value for a given stage in the plurality of stages may comprise a function of values for a plurality of stages including the given stage.

The permutation engine 125 of FIG. 1 is configured to apply the non-linear feedback shift register 130 to the initial cryptographic state 110 over a plurality of rounds to update the cryptographic state. In each round, one or more of the plurality of stages may be updated. In one case, in each round, all of the plurality of stages are updated. This may be performed by updating a given one of the plurality of stages and then shifting the plurality of stages. For example, the non-linear feedback shift register 130 may be configured to update one of the plurality of stages at a time (e.g. per clock cycle). The stage to be updated may be stored in a particular sub-register. Sub-registers associated with the plurality of stages may then be accessed to update the current stage. For example, the non-linear feedback shift register 130 may be configured to compute a function of the at least one other stage. The result of this function may then be stored in a sub-register associated with the current stage to update the current stage. After one of the plurality of stages has been updated, the plurality of stages may be shifted, e.g. by a number of bits equal to the stage length left or right, such that a new value is loaded into the sub-register for the current stage, the new value being previously one of the other stages. This may be seen as an iteration through one or more stages, where in each step of the iteration a different portion of the cryptographic state is updated. In certain cases, this process may be repeated for a given round such that all the plurality of stages are updated within the given round, e.g. such that each stage is shifted to become the current stage in each round. In other cases, the process may be repeated for a predefined number of stages that is less than the number of the plurality of stages. This may take a plurality of clock cycles. The permutation engine 125 is configured to repeat this process for a plurality of rounds to generate the updated cryptographic state 140.

The non-linear feedback shift register 130 may comprise dedicated electronic circuitry to implement the update to the cryptographic state. The electronic circuitry may comprise memory in the form of the sub-registers to store data for at least the plurality of stages. In another case, the non-linear feedback shift register 130 may be implemented using computer program code that is processed by at least one processor of a computing device, such as a microcontroller. In this latter case, the plurality of stages may comprise elements in an array that are stored in a random-access memory of the computing device. Combinations of hardware and computer program code implementations are possible depending on the implementation, as will be discussed in more detail with reference to FIG. 15.

In certain cases, the non-linear feedback shift register 130 is configured to update at least one of the plurality of stages as a non-linear function of one or more preceding stages in the plurality of stages and one or more succeeding stages in the plurality of stages. For example, if an 256-bit cryptographic state is split into sixteen 8-bit words, then an $i^{th}$ word may be updated as a current stage, using an $(i-j)^{th}$ word and an $(i+k)^{th}$ where j and k are integers greater than 0. Use of the one or more succeeding stages may increase security by providing a level of reverse or look-ahead feedback. In certain cases, the non-linear feedback shift register 130 is configured to update at least one of the plurality of stages as a non-linear function of one or more preceding stages in the plurality of stages and one or more succeeding stages in the plurality of stages. For example, an $i^{th}$ word may be updated as a current stage, using an $(i-1)^{th}$ and $(i-2)^{th}$ word and an $(i+1)^{th}$ and an $(i+2)^{th}$ word. In both cases, the non-linear feedback shift register 130 may be seen to implement a sliding window, where a current set of bits from the cryptographic state is updated using a window of bits that surrounds the current set of bits. In certain cases, the sliding window may also include a word for the stage to be updated, e.g. a previous value for the $i^{th}$ word. Given the finite length of the cryptographic state, the sliding window may pass along a wrapped-around version of the cryptographic state, where a first bit or word of the cryptographic state follows a last bit or word of the cryptographic state. This wrap around may be provided by modulo-type operations.

In an implementation that uses a sliding window approach, the apparatus 105 may comprise a set of registers to temporarily store one or more computation results from the non-linear feedback shift register 130 during a round. The non-linear feedback shift register 130 may then be configured to load the one or more computation results from the set of registers in a subsequent round. For example, in a case where a sliding window is applied to k stages in the plurality of stages, a non-linear function may be implemented using a static k-word table. The set of registers may be used to unroll a computation of a number of iterations, as is described in more detail later.

In certain implementations, the input interface 120 may be configured to receive a domain identifier 145. The domain identifier 145 may identify a particular cryptographic function associated with the update of the cryptographic state. The domain identifier 145 may comprise a plurality of bits, e.g. one or more bytes or words. In one case, the domain identifier 145 may comprise one of a set of constant values. Each constant value may indicate a different cryptographic function. If a domain identifier 145 is provided, the permutation engine 125 may be configured to apply the domain identifier 145 to the cryptographic state to update the cryptographic state. For example, the domain identifier 145 may comprise one or more bits that are added to one or more of the plurality of stages. The domain identifier 145 enables the updated cryptographic state 140 to vary with different uses, e.g. it acts as a "separator" for different cryptographic functions. For example, different types of data to be "absorbed" by the cryptographic state (e.g. where the cryptographic state is updated using the data) may have different domain identifiers, as may different operations such as hashing, encryption and padding. In certain cases, the permutation engine 125 is configured to modify the cryptographic state during each round using the domain identifier 145. For example, at the beginning of each round the domain identifier 145 may be added to one or more of the plurality of stages for the non-linear feedback shift register 130. Constant values for the domain identifier 145 may be stored within a memory of a microcontroller (e.g. within a read-only memory).

In a similar manner to the use of a domain identifier 145, in certain cases, the apparatus 105 comprises circuitry to return a round constant from a plurality of round constants, wherein the permutation engine 125 is configured to modify the cryptographic state for each round using a different round constant from the circuitry. The use of a varying round constant may help to cryptographically "separate" rounds in a similar manner to the separation of domains. Round constants may be used together with, or independently from, a domain identifier. In one case, each round constant may be a plurality of bits and have a length equal to a word length of the apparatus 105. In examples, data such as the cryptographic state, each of the plurality of stages of the non-linear feedback shift register 130, the domain identifier and the round constants may be stored in a little-endian configuration. A round constant may, for example, be applied to one of the plurality of stages that is used to update a current stage, e.g. before performing a defined function.

To support low-resource microcontrollers, the non-linear feedback shift register 130 may be configured to perform a limited or restricted number of computation operations. For example, the non-linear feedback shift register 130 may apply one or more operations from the limited set of Addition, Rotation and eXclusive-or (so-called "ARX" operations). The addition may be modular, e.g. if each of the plurality of stages has a width of w-bits, the addition may be modulo w-bits between two w-bit data values, implementing a form of "wrap-around" addition. The rotation may be provided in the form of a cyclic left or cyclic right rotation by r-bits of an w-bit data value. The non-linear function implemented by the non-linear feedback shift register 130 may provide "mixing" of the bits of the cryptographic state, e.g. by mixing words of this state. The restricted number of computations operations may enable implementation on reduced instruction set computing devices.

The non-linear function implemented by the non-linear feedback shift register 130 may comprise a number of different operations. In one case, the non-linear feedback shift register 130 is configured to first apply a first function to a set of bits for a first preceding stage and a set of bits for a first succeeding stage. This first function may be a modulo addition as described above. The non-linear feedback shift register 130 may then be configured to cyclically rotate an output of the first function, e.g. by a predefined number of bits left or right. Finally, the non-linear feedback shift register 130 may be configured to update a set of bits for a current stage based on the cyclically-rotated output of the first function. Cyclic rotation may be seen as an operation that reorders the bits with "wrap around", such that no data is lost. This sequence of operations may be seen as "mixing" portions of the cryptographic state.

In one case, additional functions may be applied to the cyclically—rotated output of the first function before the set of bits for a current stage are updated. For example, the non-linear feedback shift register 130 may be configured to, prior to updating the set of bits for a current stage, apply a second function to a set of bits from the cyclically-rotated output of the first function and a set of bits for a second succeeding stage, cyclically rotate an output of the second function, and update the set of bits for a current stage based on the cyclically—rotated output of the second function. In certain cases, the non-linear feedback shift register 130 may be further configured to apply a third function to the cyclically-rotated output of the first function and a set of bits for a second preceding stage before applying the second function and apply a fourth function to the cyclically-rotated output of the second function and a set of bits for a third preceding stage to update the set of bits for the current stage. In certain cases, the set of bits for the second preceding stage (or a set of bits tapped from another stage) may be cyclically-rotated before the third function is applied. The number of additional functions may be selected to meet a predefined level of security.

Figure 2:
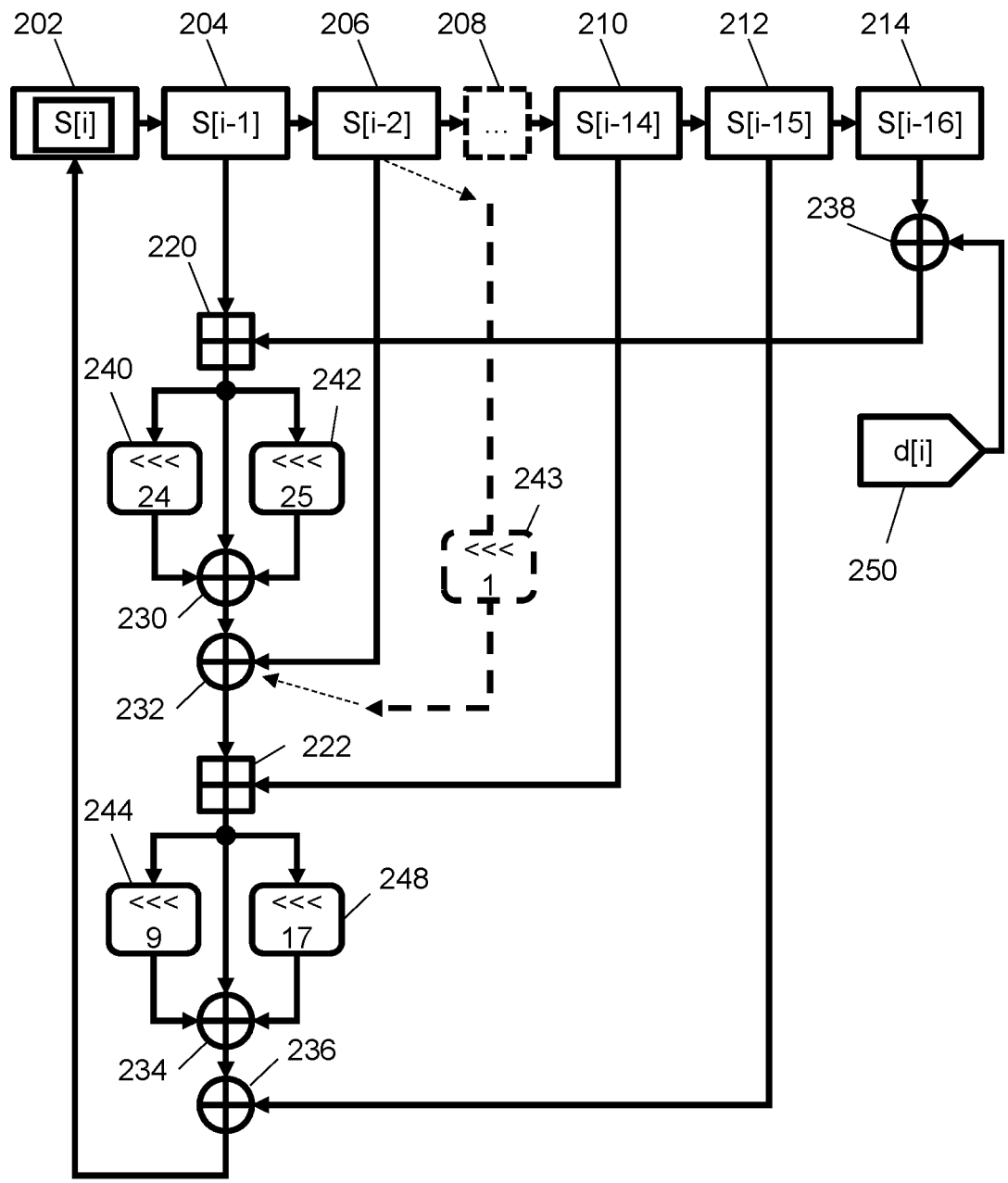
FIG. 2 is a logic diagram showing a non-linear feedback shift register according to an example and a variant thereof.

FIG. 2 shows an example implementation of a non-linear feedback shift register 200. The non-linear feedback shift register 200 may be used to implement the non-linear feedback shift register 130 using a 32-bit microcontroller. It should be understood that variations from the example of FIG. 2 are expected when implementing on different microcontrollers, and/or in different security contexts. The non-linear feedback shift register 200 comprises a plurality of sub-registers 204 to 214 that implement a plurality of stages as described above. In this example, the cryptographic state is 512 bits and the non-linear feedback shift register 200 is implemented in a 32-bit word environment. Hence, the cryptographic state is split into sixteen 32-bit words and is loaded into sub-registers 204 to 214, where each sub-register stores one word. The sub-register 202 is initially empty and is used to store a result of the non-linear function for a particular word (e.g. a result for a current stage). In the example of FIG. 2, a sliding window approach is used that is centred on an $i^{th}$ word and that looks ahead and behind by two words (i.e. that operates on stages i−2, i−1, i, i+1, i+2).

The non-linear feedback shift register 200 of FIG. 2 uses three different operations to apply a non-linear function to a stage in the plurality of stages: a binary addition modulo the word size (i.e. 32) as shown by addition units 220 and 222; a bitwise exclusive-or operation as shown by XOR units 230 to 238; and a cyclic left rotation by a specified number of bits in a 32-bit word as shown by rotation units 240 to 248. In the present example, a domain identifier is also used.

In a first operation in the non-linear feedback shift register 200 of FIG. 2, an XOR unit 238 is used to apply a bitwise exclusive-or operation to the last word in sub-register 214 and a constant value associated with a current domain identifier, as supplied by domain identifier unit 250. In certain cases, the constant value, d[i], supplied by the domain identifier unit 250 is non-zero when i modulo n is 0 or 1, where i is an index that tracks a current word being updated and n is the number of words (e.g. 16 in the present example). Hence, the constant value has a value that is not zero at the start and/or end of a cryptographic state update (e.g. for the first or last word that is processed).

In a second operation, the result of the first operation is added to a first word in sub-register 204 using addition unit 220 (e.g. applying modulo addition). In third and fourth operations, the result of the second operation is cyclically rotated left by 24 and 25 bits respectively. The third and fourth operations are applied by rotation units 240 and 242. The results from each of the rotation units 240 and 242, and from the addition unit 220, are then passed to the XOR unit 230, which applies a bitwise exclusive-or operation as a fifth operation. A further XOR unit 232 then applies a further bitwise exclusive-or operation as a sixth operation to the result of the fifth operation and a second word in sub-register 206, illustrated by the solid (i.e. direct) path between sub-register 206 and the XOR unit 232. In a variant to this, the second word in sub-register 206 may be cyclically rotated left by 1 bit, by rotation unit 243, prior to being operated on by the XOR unit 232. This variant is illustrated in FIG. 2 by the alternative dashed path including rotation unit 243 between sub-register 206 and the XOR unit 232.

In the example of FIG. 2, the operations performed by a first set of units including units 220, 240, 242, 230 and 232 are then repeated by second set of units 222, 244, 248, 234 and 236. The first set of units apply a first bi-directional mixing operation and the second set of units apply a second bi-directional mixing operation. Returning to FIG. 2, the result of the sixth operation is then added to the contents of sub-register 210 (representing a third-to-last word) using addition unit 222 in a seventh operation. The result of the seventh operation is then cyclically rotated left by 9 and 17 bits by respective rotation units 244 and 248 in eighth and ninth operations. In a tenth operation, the outputs of rotation units 244 and 248 and addition unit 222 are processed by XOR unit 234. The output of the tenth operation is then passed to a final XOR unit 236, which performs an exclusive-or operation (the eleventh) with this output and a second-to-last word in sub-register 212. The output of the final XOR unit 236 is then loaded into the first sub-register 202, which stores a result of the non-linear function as applied to an $i^{th}$ word or stage.

After one iteration, the first sub-register 202 contains a computed value for a current stage. The non-linear feedback shift register 200 may perform the eleven operations in one clock cycle or in a plurality of clock cycles, depending on the implementation. Once a value is computed for a current $i^{th}$ stage, the values in the sub-registers 202 to 214 are shifted right (as shown by the arrows in FIG. 2). The value from the first sub-register 202 is thus moved into sub-register 204 and so on. After the right shift, another iteration of the eleven operations may be performed to update a next stage in the plurality of stages, and the result stored again in the first sub-register 202. The non-linear feedback shift register 200 may be controlled, e.g. by permutation engine 125 in FIG. 1, to repeat sixteen iterations to update each word of the cryptographic state. Following sixteen iterations each original word of the cryptographic state is updated. These sixteen iterations may then form one "round" of iteration as controlled by the permutation engine 125 in FIG. 1. Following the sixteen iterations, an updated version of the cryptographic state may be read from sub-registers 204 to 214. The "shift" function of the non-linear feedback shift register 200 may be thus seen to relate to an iteration through one or more of the words of the cryptographic state.

FIGS. 1 and 2 set out examples of components that may be used to permutate electronic data. The examples of FIGS. 1 and/or 2 may be used as building blocks to construct more complex cryptographic systems. One example of a more complex cryptographic system is shown in FIG. 3.

Figure 3:
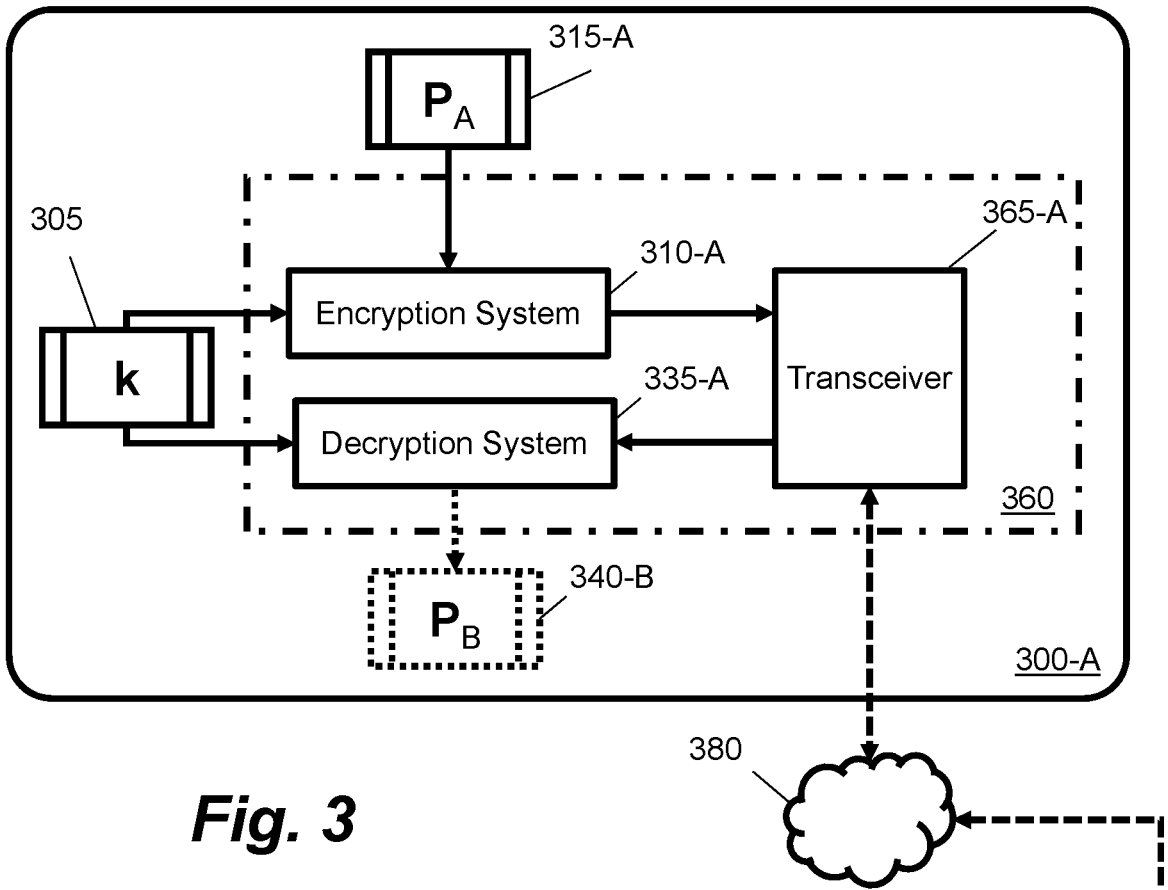
FIG. 3 is a schematic illustration showing a cryptographic system for communicating over a network according to another example.
Figure 3:
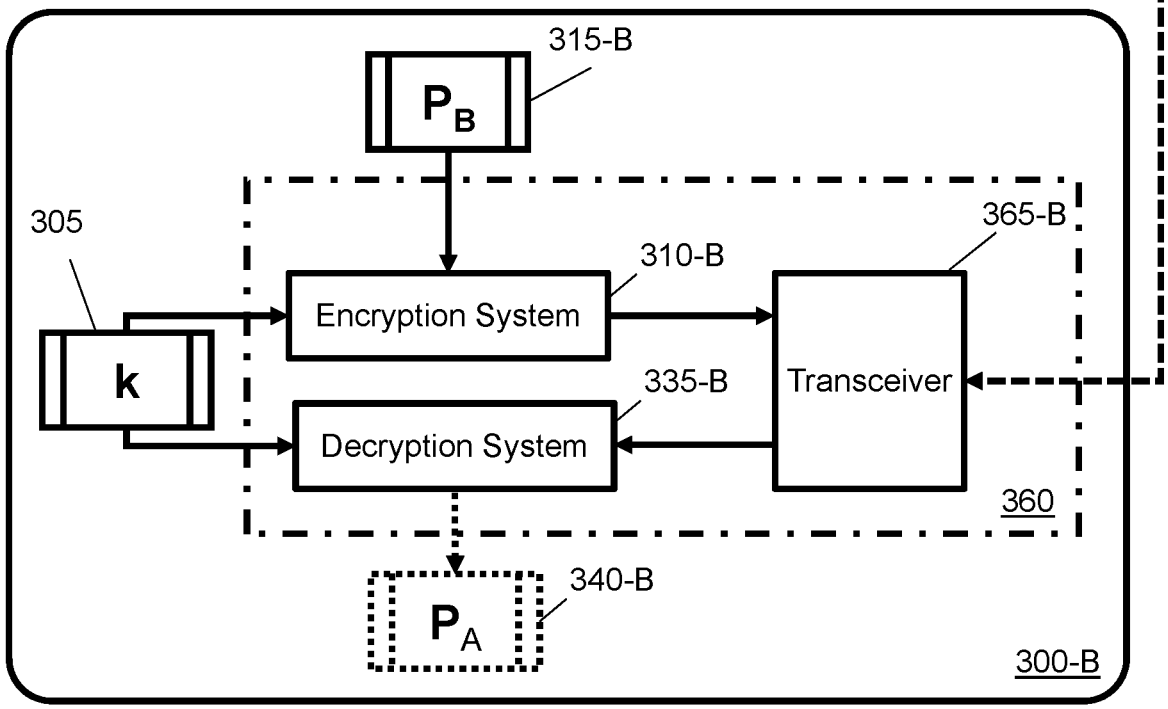

FIG. 3 shows an example of a first terminal 300-A and a second terminal 300-B that are configured to communicate over one or more networks. The two terminals 300-A, B may have a common, i.e. shared, cryptographic configuration. For example, a terminal 300 may comprise a computing device such as a server, desktop, laptop, tablet, smartphone, and/or embedded device. In one example, the first terminal 300-A may comprise a server computing device and the second terminal 300-B may comprise a limited-instruction-set embedded computing device, e.g. as integrated into a vehicle or appliance.

In the example of FIG. 3, a symmetric encryption/decryption system is provided. Hence, in this example, both terminals 300 access a common shared secret key 305. Symmetric cryptography may be more resilient to attack using quantum computing approaches. As an example, the secret key may be loaded into a secure read-only memory of the second terminal 300-B during manufacture, where a copy of this secret key is also stored securely by a controlling server in the form of the first terminal 300-A. In the present example, both terminals 300 have an encryption system 310 for encrypting data 315 and a decryption system 335 for decrypting data 340 (the data being labelled as "Plaintext"—P—in FIG. 3). In other examples, and where the second terminal 300-B is an embedded computing device, the second terminal 300-B may have only one of these systems, e.g. just the encryption system 310 for sending data or just the decryption system 335 for receiving data. Both terminals 300 also comprise a transceiver 365 to receive and transmit data. Although the transceiver 365 is shown as a single device it may comprise a separate receiver and transmitter in other examples. The encryption system 310, decryption system 335 and transceiver 365 may be implemented as a secure cryptographic module 360 within each terminal 300. For example, they may be implemented using secure electronic circuitry and/or computer program code arranged to be securely stored and processed by a processor. Secure electronic circuitry may be based on electronic circuitry such as a System-on-Chip (SoC), an Application-Specific Integrated Circuit (ASIC) or a set of Field Programmable Gate Arrays (FPGAs).

The example of FIG. 3 shows how the two terminals may securely communicate and ensure an integrity of transmitted data. For example, FIG. 3 may comprise an implementation of authenticated encryption with associated data (AEAD).

In a first case, the first terminal 300-A may wish to communicate data 315-A to the second terminal 300-B. The data 315-A may, for example, comprise a firmware update. It is important that a firmware update is encrypted for confidentiality, and that its integrity is ensured, otherwise the second terminal 300-B may be vulnerable to control by malicious parties. For example, if a malicious party was able to spoof a firmware update message, they could send their own false firmware update for installation and install their own control functions upon the second terminal 300-B. Alternatively, if malicious parties were able to gain access to the source code of the firmware update, they could search for security exploits. In this manner, both confidentiality and integrity are desired.

In a second case, the second terminal 300-B may wish to communicate data 315-B to the first terminal 300-A. The data 315-B may, for example, comprise sensitive sensor data, such as medical measurements, recorded audio data and/or temperature readings. It is important that sensitive sensor data is encrypted, e.g. to avoid interception and snooping, and its integrity also needs to be ensured, e.g. to avoid corrupted or maliciously designed data from posing as actual recorded data.

In the first case, the first terminal 300-A encrypts the data 315-A using the secret key and the encryption system 310-A. In an AEAD implementation, the encryption system 310-A may also use associated data to generate an authentication tag that may be used to check the integrity of the encrypted data. In one case, this associated data may comprise a header from one or more packets that are used to communicate the encrypted data. For example, the associated data may comprise one or more of an Internet Protocol (IP) address, public data such as a firmware update number or manufacturer data, and/or payload information such as a data size. In one case, multiple items of data may be concatenated in a binary or string format to form the associated data. The encrypted data and the authentication tag may be combined as a ciphertext payload for delivery to the second terminal 300-B via the transceivers 365-A and 365-B and a coupling set of one or more networks 380.

In the first case, the second terminal 300-B receives the ciphertext payload at transceiver 365-B and passes it to the decryption system 335-B. The transceiver 365-B may also pass a copy of the associated data, e.g. a copy of the header information or other public data that was used to generate the authentication tag. The decryption system 335-B is configured to decrypt the encrypted data and to conditionally supply decrypted data 340-B. The supply of the decrypted data 340-B may be conditional on a successful decryption and/or an integrity check. The integrity check may comprise comparing the copy of the associated data with the authentication tag and supplying the decrypted data 340-B if there is a cryptographic match. If the copy of the associated data and the authentication tag do not pass a cryptographic verification, then the decrypted data 340-B may not be released (e.g. may be deleted, quarantined, reported and/or destroyed). This can ensure that only a valid set of decrypted data 340-B is used by the second terminal 300-B. For example, if the decrypted data 340-B comprises a firmware update, this may only be installed (e.g. loaded into a read-only memory) if the decryption is successful and the integrity check is passed. This also ensures that no information is leaked response to an authentication failure.

A similar process occurs in reverse in the second case. The second terminal 300-B uses a secret key 305 and the encryption system 310-B to encrypt local data 315-B (e.g. sensor readings and the like). The encryption system 310-B may also generate an authentication tag using associated data for the local data 315-B (e.g. an IP address of the first terminal 300-A). A ciphertext payload is then generated and transmitted over the one or more networks 380 to the first terminal 300-A. At the first terminal 300-A, the decryption system 335-A conditionally decrypts and supplies decrypted data 340-B based on a similar integrity check.

Figure 4:
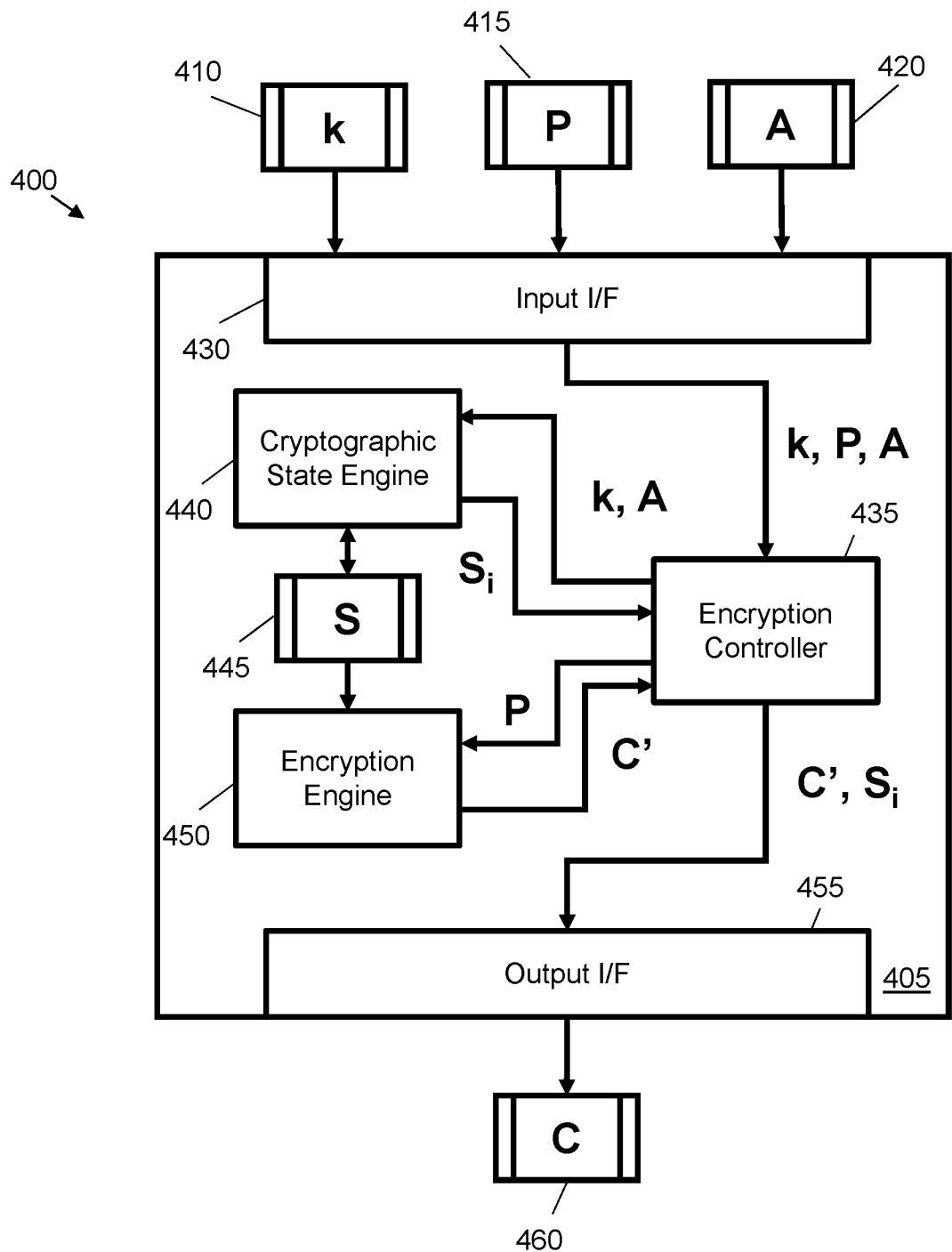
FIG. 4 is a schematic illustration showing a system for performing authenticated encryption with associated data according to an example.
Figure 5:
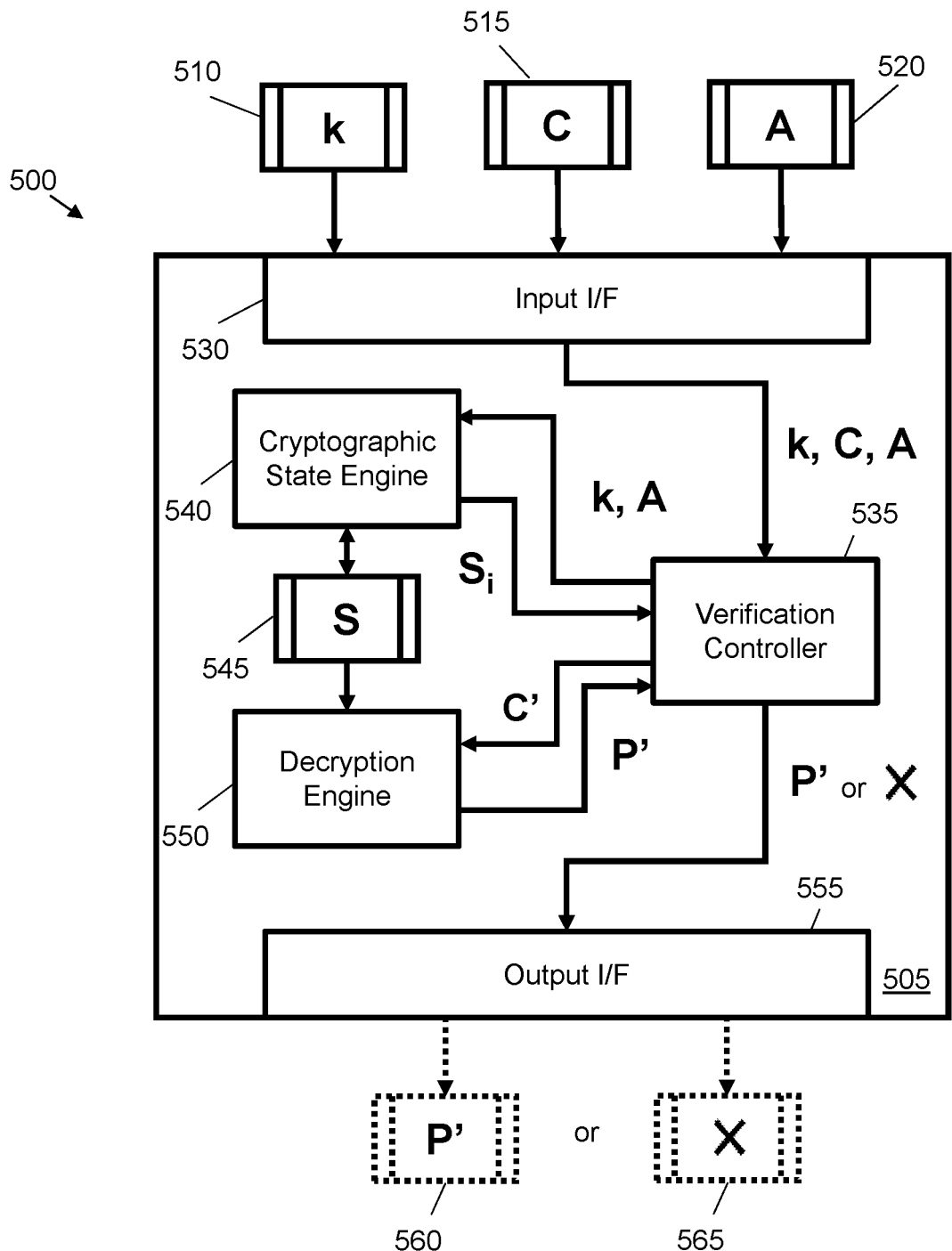
FIG. 5 is a schematic illustration showing a system for performing authenticated decryption with associated data according to an example.

FIGS. 4 and 5 show examples that may be used to respectively implement the encryption system 310 and decryption system 335 as shown in FIG. 3 (although the present examples are not limited to this context). FIG. 4 shows an example 400 of a cryptographic system 405 for authenticated encryption and FIG. 5 shows an example 500 of a cryptographic system 505 for authenticated decryption. These examples 400, 500 may be used to provide an AEAD system. The examples 400, 500 are based around an update of a cryptographic state and may use components and approaches from the examples of FIGS. 1 and 2. Both examples may be implemented in a similar manner to the example 100 of FIG. 1, e.g. using suitably configured electronic circuitry (e.g. one or more ASICs or FPGAs) and/or using a processor of a microcontroller that is configured to execute program code stored in one or more memories.

The cryptographic system 405 of FIG. 4 is configured to receive a secret key 410 ("k"), first data 415 for encryption and second data 420 to associate with the first data 415. The first data 415 may comprise plaintext ("P"), such as a binary file and/or a string. The second data 420 may comprise associated data ("A") such as header data as described above. The cryptographic system 430 comprises an input interface 430 to receive the secret key 410, the first data 415 and the second data 420. Although FIG. 4 shows a single input interface 430 that receives each item of data in other examples, separate interfaces (e.g. in space or time) may be provided. As described with reference to FIG. 1, the input interface 430 may comprise a physical interface for electronic circuitry and/or a programming interface as defined in computer program code that is executed by a processor. The secret key 410 and first data 415 may comprise the secret key 305 and data 315 as described with reference to FIG. 3.

The cryptographic system 405 of FIG. 4 further comprises an encryption controller 435 and a cryptographic state engine 440. The encryption controller 435 is communicatively coupled to the input interface 430 to receive the secret key 410, the first data 415 and the second data 420. The encryption controller 435 is also communicatively coupled to the cryptographic state engine 440. The cryptographic state engine 440 may be implemented using at least portions of the examples of FIG. 1 and/or FIG. 2. The cryptographic state engine 440 is configured to access a cryptographic state 445. The cryptographic state 445 comprises a plurality of bits and may have properties as described in the previous examples. The cryptographic state 445 may be stored in a memory of the cryptographic system 405, such as a random-access memory. In certain cases, the cryptographic state 445 may be stored in a secure register that is accessible to the cryptographic state engine 440 (e.g. similar to sub-registers 204 to 214 in FIG. 2). The cryptographic state 445 is shown in FIG. 4 as being external to the cryptographic state engine 440, however, in certain cases it may be internal, e.g. stored within one or more internal registers of the cryptographic state engine 440. The cryptographic state engine 440 may comprise dedicated electronic circuitry, e.g. a microchip implementing the apparatus 105 of FIG. 1, and/or may be implemented by program code that is stored within a memory and executed by a processor of the cryptographic system. In certain cases, the encryption controller 435 may comprise an operating system or kernel function for a microcontroller, e.g. as implemented by a general-purpose central processing unit; in other cases, the encryption controller 435 may comprise a dedicated processor such as a system-on-chip or digital signal processor. In certain cases, the functions of the encryption controller 435 and the permutation controller 125 of FIG. 1 may be combined; in other cases, they may be implemented separately, e.g. as separate processing units.

In the example 400 of FIG. 4, the cryptographic state engine 440 is configured to update the cryptographic state 445 under the control of the encryption controller 435. The cryptographic state engine 440 is configured to apply at least one of a plurality of update operations to the cryptographic state 445. For example, the encryption controller 435 is configured to instruct the cryptographic state engine 440 to update the cryptographic state 445 using the secret key 410 and the second data 420. The cryptographic state engine 440 may be configured to receive the secret key 410 and the second data 420 and to, in common or separate operations, combine this data with the cryptographic state 445. For example, each of the secret key 410 and the second data 420 may be combined with the cryptographic state 445 using an exclusive-or operation. In certain cases, this may be performed in portions, such as bit-by-bit or word-by-word. In certain cases, the cryptographic state engine 440 is configured to permutate the cryptographic state 445 as described with reference to FIGS. 1 and/or 2 if certain conditions are met, such as a particular domain identifier being provided, a portion index for the cryptographic state 445 reaching a start and/or end state, and/or an end of an operation being reached. In certain cases, the secret key 410 and/or the second data 420 may be configured to be the same size as the cryptographic state 445. In other cases, the secret key 410 and/or the second data 420 may be any size, and may be combined with the cryptographic state 445 on a portion-by-portion basis, where a different portion of the cryptographic state 445 is used in each operation, and a permutation is performed when the entire length of the cryptographic state 445 has been used (e.g. if the secret key 410 and/or the second data 420 is longer than the cryptographic state 445, before supplying additional data from the secret key 410 and/or the second data 420).

The cryptographic system 400 of FIG. 4 further comprises an encryption engine 450 to encrypt data using the cryptographic state 445. In the example of FIG. 4, the encryption engine 450 is communicatively coupled to the cryptographic state 445 (e.g. one or more registers storing the state) and the encryption controller 435. In other examples, the encryption engine 450 may be communicatively coupled to the cryptographic state engine 440 to use the cryptographic state 445 or may be configured to use the cryptographic state 445 by way of the encryption controller 435. The encryption engine 450 is configured to receive the first data 415 from the encryption controller 435 and to combine the first data 415 with the cryptographic state 445 to encrypt the first data 415. The encryption engine 450 generates encrypted first data (shown as ciphertext "C'" in FIG. 4), which is returned to the encryption controller 435. The encryption engine 450 may be configured to combine the first data 415 with the cryptographic state 445 in a similar manner to the secret key 410 and the second data 420 as described above, e.g. portion-by-portion with permutations if certain conditions are met. In one case, a combination of the cryptographic state 445 and the first data 415 is stored as an updated cryptographic state 445.

The encryption controller 435 is thus configured to control at least three update operations with respect to the cryptographic state: in a first operation, the cryptographic state 445 is updated using the secret key 410; in a second operation, the cryptographic state 445 is updated using the second data 420; and in a third operation, the cryptographic state 445 is updated using the encrypted first data. The first and second operations may be performed in any order. Each update operation may trigger a permutation of the cryptographic state 445, e.g. as described with reference to FIGS. 1 and/or 2. In one case, a permutation operation is performed after each operation as part of a padding sub-operation.

The encryption controller 435 is also configured to access at least one bit of the cryptographic state 445. In FIG. 4, the encryption controller 435 receives at least one bit ("$S_i$") of the cryptographic state 445 via the cryptographic state engine 440. In other examples, the encryption controller 435 may access the cryptographic state 445 directly (e.g. via electrical couplings) and/or via a programming interface. The at least one bit of the cryptographic state 445, as obtained after the three update operations, may be used as an authentication tag for the encrypted first data, e.g. the at least one bit of the cryptographic state 445 is a non-linear function of the secret key 410, the second data 420 and the encrypted first data. In certain cases, the number of bits that are returned from the cryptographic state 445 may be configurable, e.g. they may be set based on a passed function parameter and/or a register value.

Once the encryption controller 435 has obtained the at least one bit of the cryptographic state 445 and the encrypted first data, this is communicated to the output interface 455. The output interface 455 may be configured in a similar manner to the input interface 430 and/or the output interface 135 of FIG. 1. The output interface 455 of FIG. 4 is configured to return the encrypted first data and at least one bit of the cryptographic state 445 as a ciphertext 460 (shown as "C'" in FIG. 4). In this example, the at least one bit being is useable to determine an integrity of the second data 420, e.g. it may be used as an authentication tag as described above. Although the terms "plaintext" and "ciphertext" are used herein, this is based on convention in the field of cryptography, and it should be noted that the first data 415 and the ciphertext 460 may be provided as binary data, as opposed to "text" data.

The ciphertext 460 that is generated by the encryption system 405 of FIG. 4 may be used as described with reference to the example of FIG. 3, e.g. may be communicated over a network to a computing device for decryption and verification. FIG. 5 shows an example 500 of a decryption system 505 that may be used to perform this decryption and verification.

The decryption system 505 of FIG. 5 is similar in construction to the encryption system 405 of FIG. 4. Similar reference numerals are used to indicate similar components. The decryption system 505 is configured to operate on a secret key 510 ("k"), first data 515 and second data 520. The secret key 510 may comprise a copy of the secret key 410, e.g. as held on a different computing device. The first data 515 comprises ciphertext ("C'"), such as ciphertext 460 as output by the encryption system 405. The second data 520 may comprise a copy of the second data 420 (i.e. "A") as shown in FIG. 4. The second data 520 is associated with the first data 515, e.g. may comprise a copy of a packet header or other public data as described above.

The decryption system 505 of FIG. 5 comprises a verification controller 535, a cryptographic state engine 540, a cryptographic state 545, a decryption engine 550 and an output interface 555. In a similar manner to FIG. 4, the input interface 530 of FIG. 5 receives the secret key 510, the first data 515 and the second data 520 and passes this data to the verification controller 535. The verification controller 535 may be configured in a similar manner to the encryption controller 435 of FIG. 4. In one case, the cryptographic state engine 540 may comprise the same logic circuitry as the cryptographic state engine 440, e.g. comprise a common chip or program module; in other cases, cryptographic state engine 540 may comprise an instantiation of a generalised cryptographic state engine, where the instantiation is adapted for decryption. Similarly, the cryptographic state engine 440 of FIG. 4 may comprise an instantiation of a generalised cryptographic state engine that is adapted for encryption. In the decryption system 505 of FIG. 5, the cryptographic state engine 540 and the cryptographic state 545 are used in a similar manner to that described with reference in FIG. 4. The cryptographic state engine 540 is configured to apply at least one of a plurality of update operations to update the cryptographic state 545, where the cryptographic state 445 comprises a plurality of bits.

In FIG. 5, the verification controller 535 controls the cryptographic state engine 540 in a similar manner to the encryption controller 435 of FIG. 4. On receipt of the secret key 510 and the second data 520, these may be passed to the cryptographic state engine 540 to update the cryptographic state 545. This may comprise repeating first and second update operations as described above. The update operations may be ordered as per the encryption system 405. The decryption engine 550 is then configured to decrypt data using the cryptographic state 545, e.g. following the update operations using the secret key 510 and the second data 520. As such, the decryption engine 550 may receive a first portion of the first data 515. This first portion may be the encrypted first data (i.e. "C'" from FIG. 4). The first portion may be delineated by a predefined number of bits and/or based on header information forming part of the first data 515. The decryption engine 550 is instructed by the verification controller 535 to decrypt the first portion of the first data 515 using the cryptographic state. This may comprise repeating an operation used to encrypt the first portion, e.g. computing an exclusive- or operation between portions of the first portion of the first data 515 and the cryptographic state 545 following first and second update operations that use the secret key 510 and the second data 520. The decryption engine 550 may return the resulting decrypted data (e.g. plaintext "P'" in FIG. 4) to the verification controller 535. The decryption operation may also comprise updating the cryptographic state 545 using the first portion of the first data 515 (e.g. using the encrypted first data "C'" as shown in FIG. 4). Decryption may be performed on a portion-by-portion basis (e.g. bit-by-bit, byte-by-byte or word-by-word), where the cryptographic state 545 is permutated following each update operation and/or when an end portion of the cryptographic state 545 is reached.

To perform an integrity check, the verification controller 535 is configured to obtain at least one bit of the cryptographic state 545 and to compare this with a second portion of the first data 515. The at least one bit of the cryptographic state 545 may comprise a number of bits that are equal to the number of bits of the second portion of the first data 515. The second portion of the first data 515 represents at least one bit of the cryptographic state from an encryption operation, e.g. an authentication tag as generated by the encryption system 405. The at least one bit of the cryptographic state 545 as obtained by the verification controller 535 may be seen as a copy of the authentication tag that is regenerated following decryption (and the three update operations). The verification controller 535 may be configured to compare the authentication tag in the first data 515 with the regenerated authentication tag. If they match, then the integrity of the data is verified and the verification controller 535 may supply the decrypted data to the output interface 555 for supply as a decrypted data 560, e.g. a decrypted version of the first data 415 that was encrypted by the encryption system 405. This may be considered an authentication success—the integrity of the data is validated, and it may be assumed that the encrypting process had access to the correct secret key. If the authentication tags do not match, i.e. the at least one bit of the cryptographic state 545 following decryption does not match the original at least one bit of the cryptographic state 445 following encryption, then the verification controller 535 indicates an authentication failure. An authentication failure may be indicated in a number of ways. In the case illustrated in FIG. 5, a message indicating authentication failure 565 is returned. In other cases, it may be deemed more secure to provide no output from the process, or to provide dummy plaintext.

In the examples of FIGS. 3 to 5, a confidentiality of data, e.g. data transmitted over a network, may be set at k-bits, indicating a fixed length of a secret symmetric key. An integrity of the data may be set at t-bits, indicating a fixed number of bits of the cryptographic state that is used as an authentication tag. In one case, for a fixed-size cryptographic state, i.e. b bits, a rate of the AEAD systems may be set as r-bits, where $r=b-k$. The systems may provide integrity and confidentiality protection for plaintext data (e.g. the data 315 or 415) and ciphertext, and integrity protection for the associated data (e.g. the second data 420 and 520). In test cases, key lengths of 128 or 256 bits were used, with tag lengths of 128 bits. For implementations on computing devices with access to more memory and processing power, these lengths may be increased to provide greater security.

The examples of FIGS. 4 and 5 may be implemented using lightweight electronics and/or computer program code. In test examples, executable microcontroller code for the encryption system was of a size between 600 and 1100 bytes depending on the microcontroller (excluding the cryptographic state engine, which was implemented as a separate module, e.g. as shown in later FIGS. 10A and 10B).

In addition to encryption and decryption, as described with relation to the examples of FIGS. 3 to 5, similar cryptographic systems may be implemented that use the cryptographic state engine 440, 540 to construct synchronised, continuously authenticated states between two or more devices. For example, these approaches may be used as primitives to build complex mesh network cryptographic protocols.

Figure 6:
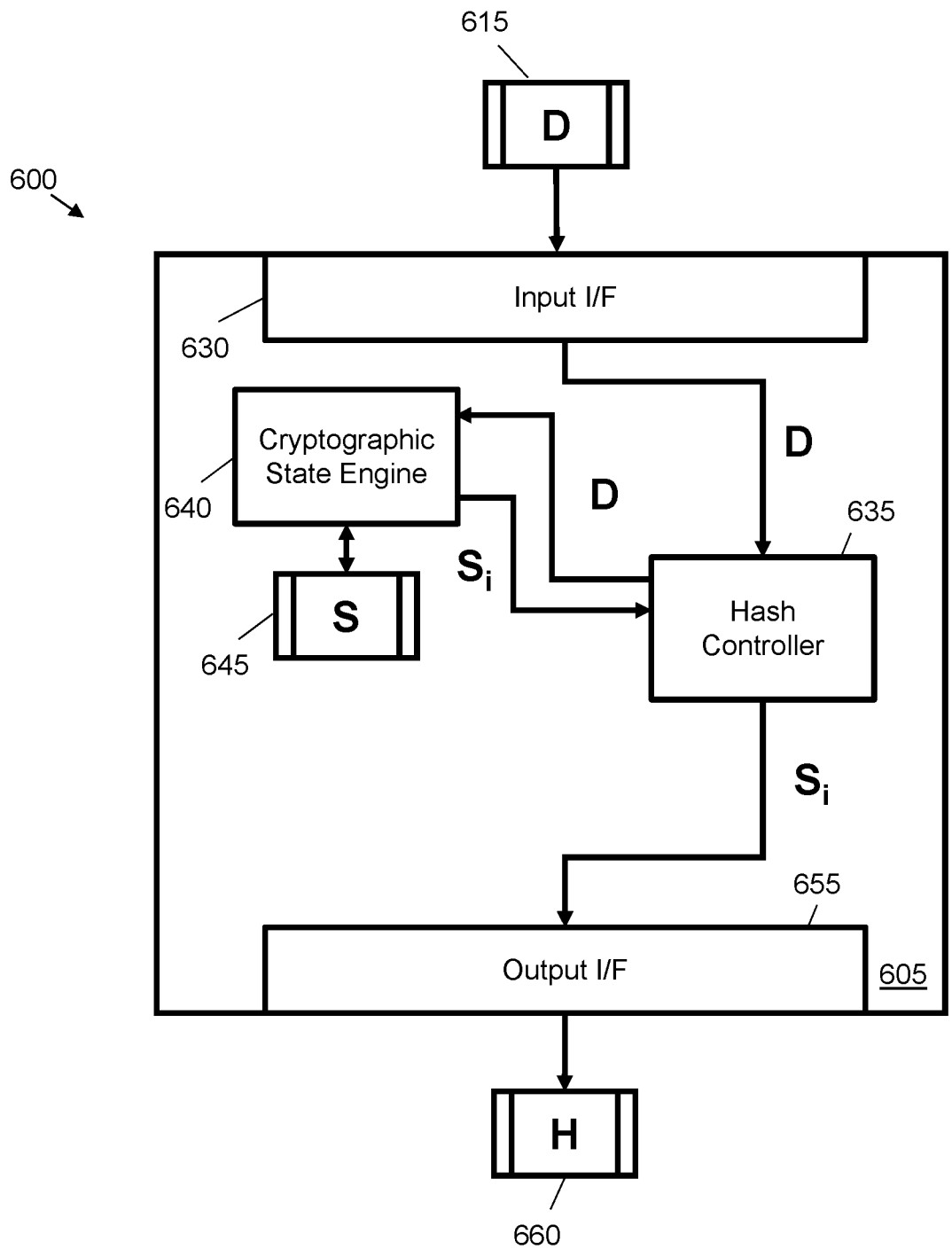
FIG. 6 is a schematic illustration showing a system for hashing digital data according to an example.

FIG. 6 shows one example 600 of a further cryptographic system 605 that may be constructed using the approaches described herein. The cryptographic system 605 of FIG. 6 may be used to apply a hash function to data 615.

The cryptographic system 605 of FIG. 6 is constructed in a similar manner to the encryption and decryption systems 405, 505 of FIGS. 4 and 5. The cryptographic system 605 comprises an input interface 630 to receive the data 615, a cryptographic state engine 640 to update a cryptographic state 645, a hash controller 635 to instruct the cryptographic state engine 640 to update the cryptographic state 645 using the received data 615 from the input interface 630, and an output interface 655 to provide at least one bit of the cryptographic state 645 as an output of the hash function as applied to the received data 615.

In this manner, the cryptographic state engine 640 may be applied in a similar manner to the cryptographic state engines 440, 540. In one case, the action of the cryptographic system 605 may be seen as a generalisation of the operations performed on the secret key and the associated data in the examples of FIGS. 4 and 5. The cryptographic state engine 640 may be configured to first initialise the cryptographic state 645. This may comprise clearing the cryptographic state 645, e.g. setting all bits of the state to zero and setting a portion index to zero. Following this, the cryptographic state engine 640 may be configured to add the data 615 to the cryptographic state 645. This may comprise an "absorption" operation as described above, e.g. cryptographic state engine 640 may iterate through the bits of the data 615 and the bits of the cryptographic state 645, performing an exclusive-or (XOR) operation on each pair of bits. Separate indexes may be tracked for each of the data 615 and the cryptographic state 645 (e.g. a loop though the bits of the data 615 may comprise an index increment command for a portion index of the cryptographic state 645). A portion index for the cryptographic state 645 may comprise a bit index. As described above, if an end portion of the cryptographic state 645 (e.g. a last bit) is reached, then the cryptographic state 645 may be permutated and the portion index returned to zero. Permutation may also be triggered by a control flag, such as a domain identifier set to a constant value indicating a "full" state. In certain cases, a permutation may be triggered based on a given value of the control flag and a number of rate bits (r) being reached. In one case, the cryptographic state engine 640 may be configured to get a particular number of portions from the cryptographic state 645 (e.g. where portions may be bits, bytes or words). As each portion is obtained, a portion index may be incremented as described above. Again, this may comprise a permutation if certain conditions are met. These operations of the cryptographic state engine 640 may also be provided by the cryptographic state engines 440, 540 of the previous examples.

The hash function implemented by the cryptographic system 605 may produce an h-bit hash H from input data D of arbitrary bit length a. The length of the hash, h, may be configured by setting the number of bits to retrieve from the cryptographic state 645. The security against collision for these hashes may be said to be $2^{((b-r)/2)}$ where b is the length of the cryptographic state and r is the defined rate. This may be deemed equivalent to $2^{(h/2)}$ for fixed length hashes. The number of rounds performed in each permutation may be configurable (e.g. 4, 8 or 16). Different combinations of hash length, rate and the number of rounds may be used to provide different specified security requirements. In certain cases, the hash function may be considered an extensible-output function (XOF). In certain cases, an output of the hash function may be padded, e.g. using permutations of the cryptographic state 645 as described for the previous examples.

Again, the cryptographic system 605 of FIG. 6 may be implemented with a small implementation footprint, e.g. in terms of logic circuitry and/or lines of program code. In test cases, the cryptographic system 605 was implemented in between 150 and 300 bytes of code on various microcontrollers. The approaches may also be adapted to provide incremental and keyed constructions.

In certain cases, the cryptographic system 605 of FIG. 6 may be adapted to function as a seed expander with a limited cryptographic strength. This may be used to provide "random-like" stuffing or padding, e.g. using returned bits from the cryptographic state 645. In certain cases, an adapted cryptographic system may be used to expand a short seed into a public value, e.g. as used in post-quantum lattice-based cryptography.

In similar cases, the cryptographic system 605 of FIG. 6 may be adapted to function as a general-purpose random number generator. "Randomness" may be inserted by adding data to the cryptographic state 645 as shown in FIG. 6. In certain cases, adding randomness may comprise triggering a permutation of the cryptographic state 645. Cryptographic security may be configured by setting a number of rounds for the permutation to eight or higher. The rate may also be limited to half the number of bits for the cryptographic state.

Figure 7:
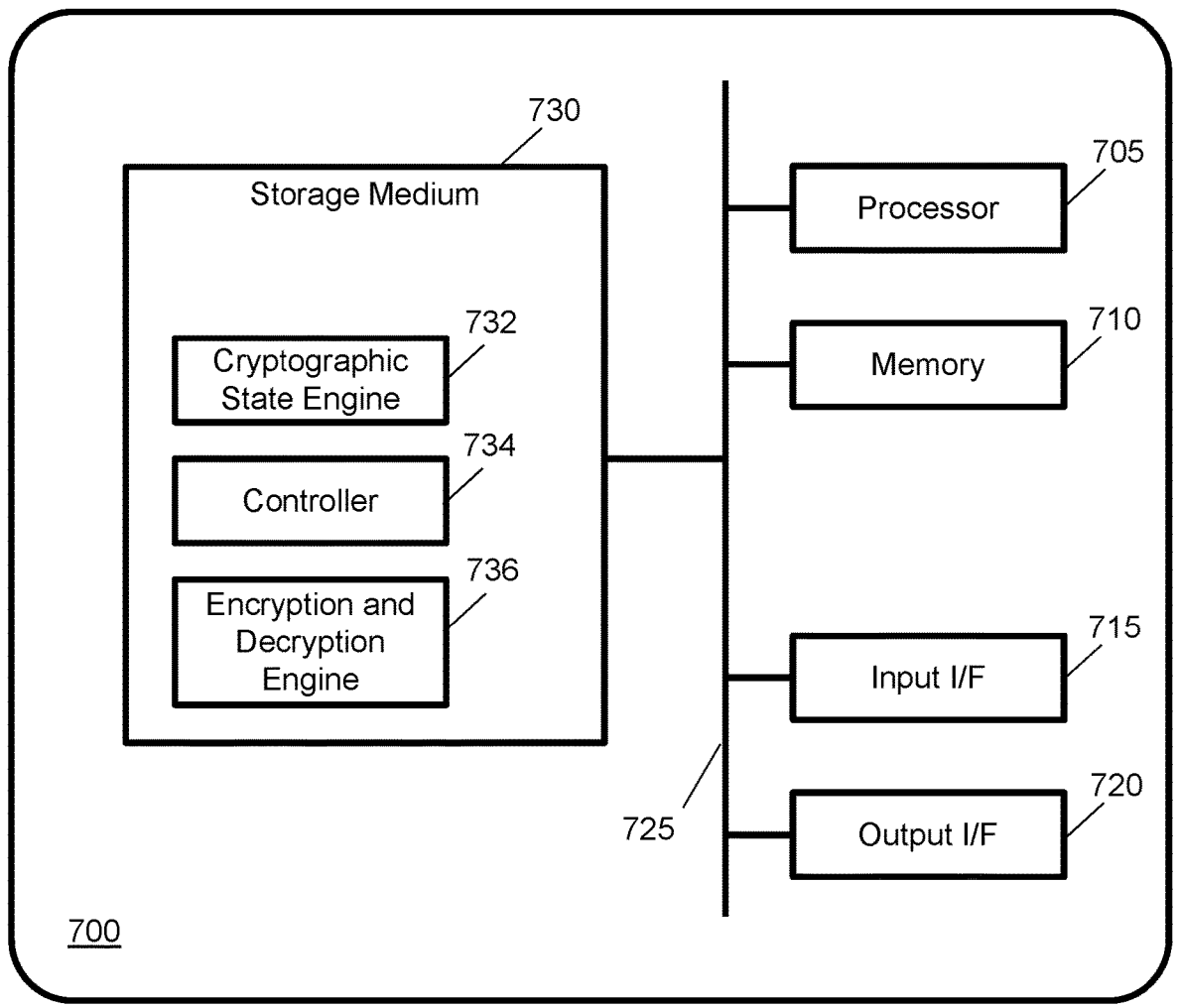
FIG. 7 is a schematic illustration showing a computing device according to an example.

FIG. 7 shows a computing device 700 that implements a cryptographic system. The computing device 700 may comprise an embedded device. The computing device 700 may be used to implement one or more of the examples of FIGS. 1, 4, 5 and 6. The computing device 700 comprises at least one processor 705, a memory 710, an input interface 715 and an output interface 720. These components are electrically coupled using a systems bus 725. A storage medium 730 is also electrically coupled to the storage bus 725. The input and output interfaces 715, 720 may comprise parts of a common interface, such a network interface to couple the computing device 700 to a communications channel such as a wired or wireless network. In the example of FIG. 7, the storage medium 730 comprises computer program code (i.e. instructions) to implement a number of cryptographic functions. The storage medium 730 may be non-transitory, e.g. solid-state memory. In certain cases, the storage medium 730 may comprise a read-only memory, e.g. that stores firmware for a microcontroller.

In the example of FIG. 7, the computer program code comprises cryptographic state engine code 732, controller code 734 and encryption and decryption engine code 736. The cryptographic state engine code 732 may implement the apparatus 105 and/or one or more of the cryptographic state engines 440, 540, 640. The controller code 734 may implement one or more of the encryption controller 435, the verification controller 535 and the hash controller 635. The controller code 734 may also be configured to provide other cryptographic functions such as seed expander and random number generator functions. The encryption and decryption engine code 736 may implement the encryption engine 450 and the decryption engine 550 as shown in FIGS. 4 and 5. The computer program code within the storage medium 730 may be loaded into the memory 710 for execution by the at least one processor 705. In this case, the memory 710 may comprise a random-access memory. The computer program code may form part of an operating system or kernel of the computing device 700. The operating system may comprise a real-time operating system (RTOS) or an implementation of an embedded Linux kernel. In other examples, the cryptographic functions may also be implemented, in whole or in part, by dedicated processing chips that are securely installed on a motherboard of the computing device 700, e.g. in the form of SoCs, ASICs or FPGAs.

In certain cases, the cryptographic state engine of the previously-described examples may be configured to receive a domain identifier indicating one of a plurality of update operations. For example, in a 32-bit system, the domain identifier may comprise (or be converted into) a 32-bit integer indicating a particular mode or function. The domain identifier may be used to indicate a particular flag, and/or to delineate inputs and outputs with regard to the cryptographic state. The domain identifier may be used to cryptographically "separate" the functions as described previously. In one case, the domain identifier may indicate one or more of a last block of the cryptographic state, a full state, an authentication data operation, a hash operation, a full-state authentication operation, use of a secret key (e.g. as data to absorb), an initialisation flag, a hash output, use of a plaintext input (e.g. as data to absorb) and use of a cipher input (e.g. as data to absorb). The cryptographic state engine may be configured to update the cryptographic state as a function of the domain identifier, e.g. to add it to a first portion of a cryptographic state (e.g. using an XOR operation) at a start of a new cryptographic operation.

As discussed above, in certain cases the cryptographic state engine is configured to store a bit index indicating a current bit of the cryptographic state, wherein an update operation is applied to a current bit of the cryptographic state as indicated by the bit index before the bit index is incremented. In this manner, the cryptographic state may be updated using pairs of bits, one from the cryptographic state and one from received data (e.g. data to absorb). In this case, the cryptographic state engine may be configured to complete an update of the cryptographic state by padding and permutating the cryptographic state and resetting the bit index. In this case, the encryption engine 450 may be configured to apply an exclusive-or operation to each bit of the first data and a consecutively-indicated bit of the cryptographic state 445 to generate a bit of encrypted first data, wherein a result of each exclusive-or operation is used to update the bit index for the cryptographic state 445, and the bit index is incremented following each exclusive-or operation. In a similar manner, the decryption engine 540 may be configured to apply an exclusive-or operation to each bit of the first portion of first data 515 and an indicated bit of the cryptographic state 545 to generate a bit of decrypted data, wherein a result of each exclusive-or operation is used to update the bit index for the cryptographic state 545, and the bit index is incremented following each exclusive-or operation.

In one case, the secret key 410 and/or 510 may be received together with a nonce, a temporary (e.g. non-repeating with respect to the secret key) fixed-length portion of data such as a random number. The nonce may be received by the input interface 430, 530 and concatenated with the secret key 410, 510. In certain cases, additional data may also be concatenated.

A number of cryptographic methods will now be described. These methods may be used in association with the cryptographic systems of the previous examples or may be used as a whole or part of a different cryptographic system. In certain cases, the methods may be implemented by loading program code (such as low-level programming code and/or assembly language) into memory and executing this code with one or more processors. In other cases, the methods may be implemented using dedicated logic circuitry.

Figure 8:
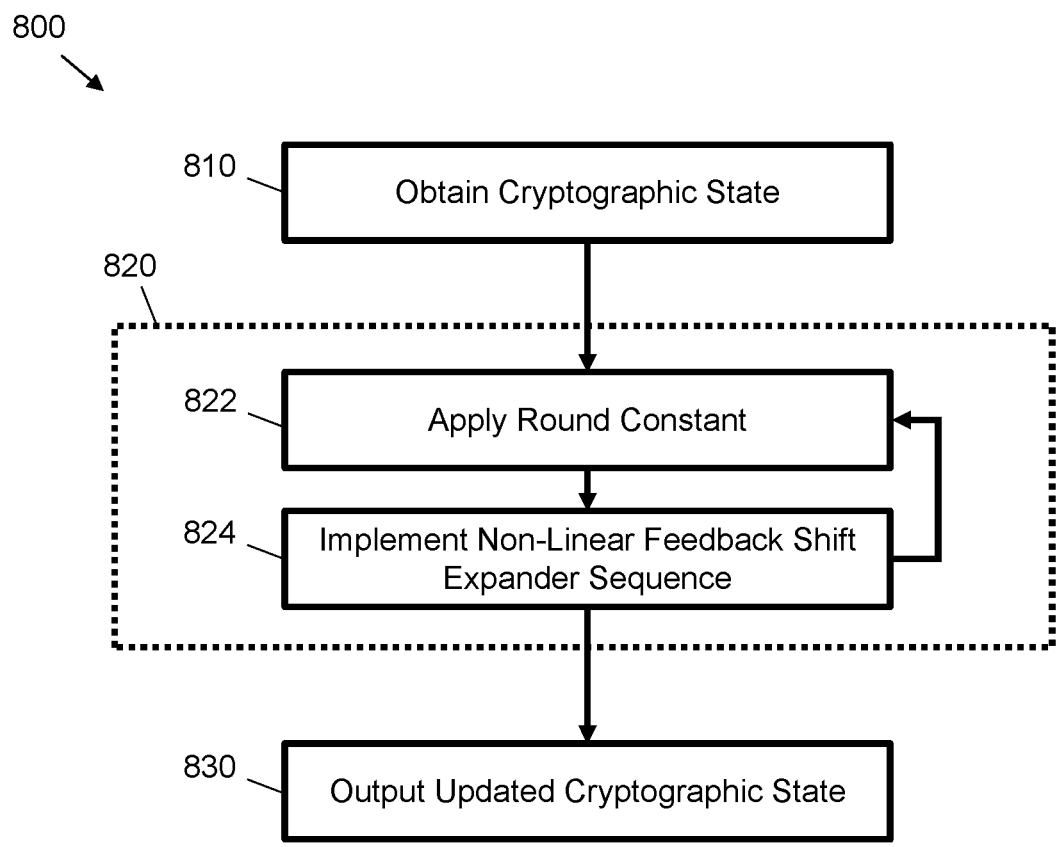
FIG. 8 is a flow diagram showing a method of permutating electronic data according to an example.

FIG. 8 shows a method 800 of updating a cryptographic state according to an example. The method may be used to permutate electronic data. The method comprises a first block 810 of obtaining a cryptographic state. The cryptographic state comprises a plurality of bits, e.g. as previously described. The method then comprises at least one looped section 820. The blocks within the looped section 820 are repeated for a predefined number of rounds. The predefined number may be one or may be greater than one. In test implementations, the number of rounds was varied between 4 to 16. The number of rounds may be increased to increase security and reduced responsive to limited processing resources.

At block 822, a round constant is applied to the cryptographic state. The round constant is specific to a current round, e.g. the round constant may change from round to round (i.e. with every loop repetition within looped section 820). In one case, the round constant is selected from a set of differing round constants, the length of the set being equal to the number of rounds in looped section 820. A round constant may comprise an integer that is represented as one or more bits. The round constant may be applied to at least a portion of the cryptographic state using a bitwise exclusive-or operation. The round constant may be of a length that is equal to a word length of a processor that is implementing the method 800. In this case, the portion of the cryptographic state may comprise a word of the cryptographic state. If the word of the cryptographic state is seen to represent an integer value (e.g. of "int32" type for a 32-bit microprocessor), then applying the round constant may be deemed a form of integer arithmetic.

At block 824, following the application of the round constant, a non-linear feedback shift expander sequence is implemented using the plurality of bits of the cryptographic state to update the cryptographic state for the current round. This may comprise performing the operations described with reference to FIG. 2 above or FIG. 9A below. The non-linear feedback shift expander sequence may mix portions of the cryptographic state in a one-way manner. In certain cases, block 824 may comprise repeating a mixing function for a plurality of portions of the cryptographic state. In one case, the mixing function may be repeated for all the portions of the cryptographic state. These portions may comprise bits, bytes and/or words, i.e. sets of one or more bits. The cryptographic state following the non-linear feedback shift expander sequence (i.e. an updated cryptographic state) is used as an input for a next round. In this manner, the cryptographic state is updated in-place, e.g. where an updated version of the cryptographic state overwrites a previous version of the cryptographic state. At block 830, the cryptographic state, as updated over the predefined number of rounds, is output.

In certain cases, the method 800 may also comprise obtaining a domain identifier. The domain identifier indicates one of a plurality of different update operations and may have a function as described above. A domain constant may be determined based on the domain identifier. In one case, the domain constant is the domain identifier and comprises a binary value that is provided to the method 800. If a domain constant is used, it may be applied to the cryptographic state, in each round, e.g. in a similar manner to block 822.

In a case where a portion of the cryptographic state comprises a word, implementing a non-linear feedback shift expander sequence at block 824 may comprise accessing the plurality of bits of the cryptographic state as a plurality of words, each word comprising a set of w-bits, and, for at least one word in the plurality of words, updating the word as a non-linear function of one or more preceding words in the plurality of words and one or more succeeding words in the plurality of words. In one case, a plurality of preceding and succeeding words may be used.

FIG. 9A shows pseudo-code that defines a non-linear feedback shift expander sequence 900 according to one example. For ease of explanation, a non-linear feedback shift expander sequence 900 that corresponds to the non-linear feedback shift register 200 of FIG. 2. The non-linear feedback shift expander sequence 900 comprises seven operations 910 to 922 that are performed on portions of the cryptographic state. The result of each operation is denoted by $t_j$ (e.g. $t_1$ to $t_7$). These portions as indicated by s[i], where i is a portion index. The pseudocode of FIG. 9A shows a set of operations that may be performed to update a given portion of the cryptographic state, e.g. in operation 924 the $i^{th}$ portion is updated using the result of the seventh operation 922. It is noted that operation $t_4$ in FIG. 9A represents the pseudo-code for the shift register of FIG. 2 in which there is a solid (i.e. direct) path between sub-register 206 and the XOR unit 232. In FIG. 9A, an alternative operation, denoted $t_4'$, represents the pseudo-code for the variant of the shift register in FIG. 2 in which the second word in sub-register 206 is cyclically rotated left by 1 bit, by rotation unit 243, prior to being operated on by the XOR unit 232. Similarly modified pseudo code will apply to other variants in which words from different sub-registers may be cyclically-rotated by the same or different amounts.

The non-linear feedback shift expander sequence 900 of FIG. 9A is implemented using three sub-operations: an exclusive-or operation 932, an addition operation 924 that is modulo the portion length, and a cyclic rotation operation 936. These sub-operations are the ARX operations described with reference to FIG. 2. In the non-linear feedback shift expander sequence 900, the operations are performed on portions of the cryptographic state (s[i] where i is set as indicated in each operation), previous operation results $t_j$, and a domain constant d[i], the latter being configured as described with respect to FIG. 2. In FIG. 9A, the variable n is a fixed integer value indicating a number of portions within the cryptographic state. A minimum value of n may depend on an amount of look-ahead and look-behind performed in the non-linear feedback shift expander sequence 900, e.g. the sequence of FIG. 9A implements a sliding window function where the window has a width of five, so n is greater or equal to five (i.e. i−2, i−1, i, i+1, i+2). In a 512-bit case, with a 32-bit word processor, n may equal sixteen, representing the division of the whole cryptographic state into sixteen portions of length 32-bits.

FIG. 9B shows example pseudo-code 940 that defines a set of round constants for an example with a word length of 32-bits and n=16. The round constants are defined as an array 942 of values, where each value is a 32-bit integer. The round constants are shown in hexadecimal format 944 (i.e. Ox where the first value represents the first 16-bits and the second value represents the second 16-bits). The values for the round constants may be selected as bytes from a maximum distance separable code, e.g. as selected in decreasing-increasing order. The examples shown provide a Hamming distance between each pair of round constants of at least four. In certain cases, efficient digital circuits may be constructed to generate the round constants in this manner, e.g. the last 8 bytes may be determined as the logical inverse of the first 8 bytes. In certain examples the last 8 bytes may not be used.

FIG. 10A shows example pseudo-code 1000 for an implementation of the method 800. The pseudo-code 1000 shows a function for performing a permutation on a 512-bit cryptographic state. The function receives parameters in the form of a cryptographic state "s", a domain identifier "dom" and a number of rounds "rounds". The cryptographic state may be represented as sixteen 32-bit words (e.g. as shown in the second line of the function). The domain identifier and the number of rounds are received as 8-bit integers but are converted into 32-bit words before being respectively applied to each of the first and second (indexes "0" and "1") words of the cryptographic state in each loop iteration. In the example of FIG. 10A these parameters are applied using a bitwise exclusive-or operation (represented by "ʌ"). The function implements two "for" loops, an outer loop with respect to the index i and an inner loop with respect to the index j. The outer loop implements the loop section 820 over the number of rounds. The inner loop repeated applies a windowed function ("F_WIN") to a given word of the cryptographic state, repeating over all the words of the state (e.g. where each iteration of the inner loop represents a step through the words or portions of the cryptographic state). The windowed function may implement the non-linear feedback shift expander sequence 900. In one case, this may be implemented using the pseudo-code 1010 shown in FIG. 10B. In this pseudo-code 1010, "&" represents a bitwise "AND" operation and "ROL32" represents a left cyclic rotation function for 32-bit values (where the number of bits to rotate is supplied as the second parameter). In another case, pseudo-code 1011 in FIG. 10C implements the variant that is illustrated in FIG. 2, and by operation $t_4'$ in FIG. 9A, in which the second word in sub-register 206 is cyclically rotated left by 1 bit, by rotation unit 243, prior to being operated on by the XOR unit 232). Similarly modified pseudo code will apply to other variants in which words from different sub-registers may be cyclically-rotated by the same or different amounts. It should be noted that in other microprocessors, e.g. those that use 8 or 16-bit words, that the form of this pseudo-code may change. Also the commands that are used to implement the functions may vary depending on the implementation and security requirements.

Figure 11:
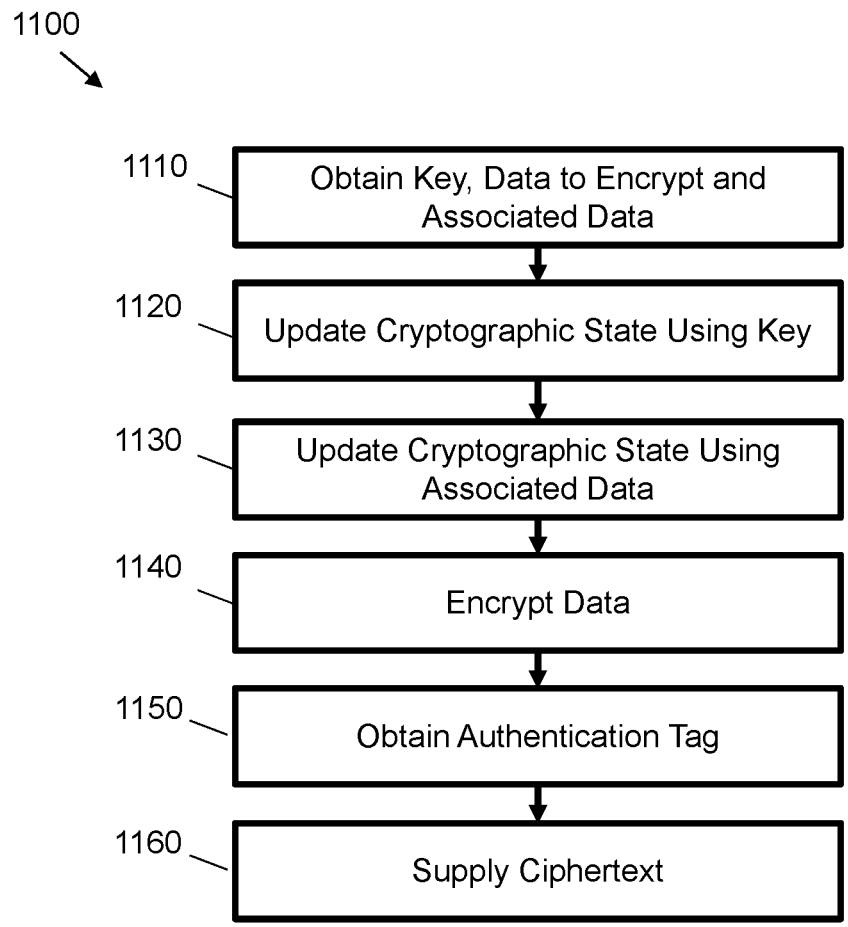
FIG. 11 is a flow diagram showing a method of encrypting electronic data according to an example.

FIG. 11 shows a method 1100 for authenticated encryption. This method 1100 may be implemented using the cryptographic system 405 of FIG. 4 or another system, e.g. comprising a processor and memory. At block 1110, the method comprises obtaining at least a secret key, first data to encrypt and second data to associate with the first data. The first data to encrypt may comprise plaintext and the second data may comprise information from a packet header. In one case, the secret key is supplied with additional data such as a nonce and/or an identifier. In this case, the additional data may be concatenated with the secret key and/or supplied as already concatenated data. The secret key may form part of a symmetric key implementation. In certain cases, block 1100 may be performed by implementing an application programming interface (API) that is configured to receive the secret key, a nonce, associated data and plaintext. In this case, the obtaining at block 1110 may comprise accessing data passed over this API.

At block 1120, the method 1100 comprises updating the cryptographic state using the secret key. This may comprise calling an "absorb" function with key data based on the secret key and a domain identifier indicating a key-based function. The key data may comprise the secret key itself or a concatenation of data as described above. The "absorb" function may comprise a portion-wise exclusive-or operation between portions of the passed data and portions of the cryptographic state. These portions may be bits, bytes or words. In a portion-wise operation, block 1120 may comprise iterating through the portions of the passed data, where a portion index for the cryptographic state is updated using the domain identifier following each portion of the passed data. Incrementing a portion index for the cryptographic state may comprise performing a permutation of the cryptographic state responsive to certain conditions being met, e.g. an end of the cryptographic state being met. In certain cases, after updating at block 1120, the block is completed by calling a "finish" function. The "finish" function may comprise padding and/or permutating the cryptographic state. A domain identifier representing a key-based operation may be passed to the "finish" operation.

Returning to FIG. 11, at block 1130 the cryptographic state is updated using the second data. This may comprise a similar set of operations to block 1120, but where the key data is replaced with the second data. A domain identifier may be supplied that indicates an associated-data-based operation. Block 1130 may also comprise calling "absorb" and "finish" functions.

At block 1140, following the previous two update operations, the first data is encrypted using the cryptographic state. This may comprise calling an "encrypt" function with plaintext to encrypt and a domain identifier indicating an encryption or AEAD operation. The "encrypt" function may comprise an adapted version of the "absorb" function, where the portions of the first data are combined with the cryptographic state (e.g. in a similar manner to blocks 1120 and 1130) but where in each portion iteration the "encrypt" function updates the cryptographic state using the portion of the first data. In one case, this may comprise replacing a given portion of the cryptographic state with the result of the "absorb" function as applied to a portion of the first data and the given portion of the cryptographic state. The results of the "absorb" function across the portions of the first data may be stored and returned as encrypted first data. As before, indexes may be used to iterate through portions of the first data and portions of the cryptographic state, e.g. where both indexes are monitored and updated in parallel. The "encrypt" operation may be followed by a "finish" operation as may be performed for blocks 1120 and 1130.

The result of block 1140 is a set of encrypted first data and an updated cryptographic state. At block 1150, an authentication tag is obtained using the cryptographic state. The authentication tag is useable to determine an integrity of the second data. The authentication tag may be obtained by calling a "get" function with respect to the cryptographic state. The "get" function, as with the functions described above, may receive a domain identifier. In this case, the domain identifier may indicate a hash operation. The "get" function may also receive a parameter indicating a number of portions of the cryptographic state to obtain. This may be, for example, a length in bits. The "get" operation may retrieve portions of the cryptographic state on a portion-by-portion basis, starting at a portion as indicated by a running portion index for cryptographic state. As each portion is retrieved the portion index may be incremented.

At block 1160, the encrypted first data and the authentication tag are supplied as a ciphertext. For example, this may comprise returning data from a function as executed by a processor and/or communicating data over one or more output pins of a processing chip. For example, this may comprise supplying the ciphertext in response to the API call described with reference to block 1110. In one case, the encrypted first data and the authentication tag are concatenated to supply the ciphertext.

Figure 12:
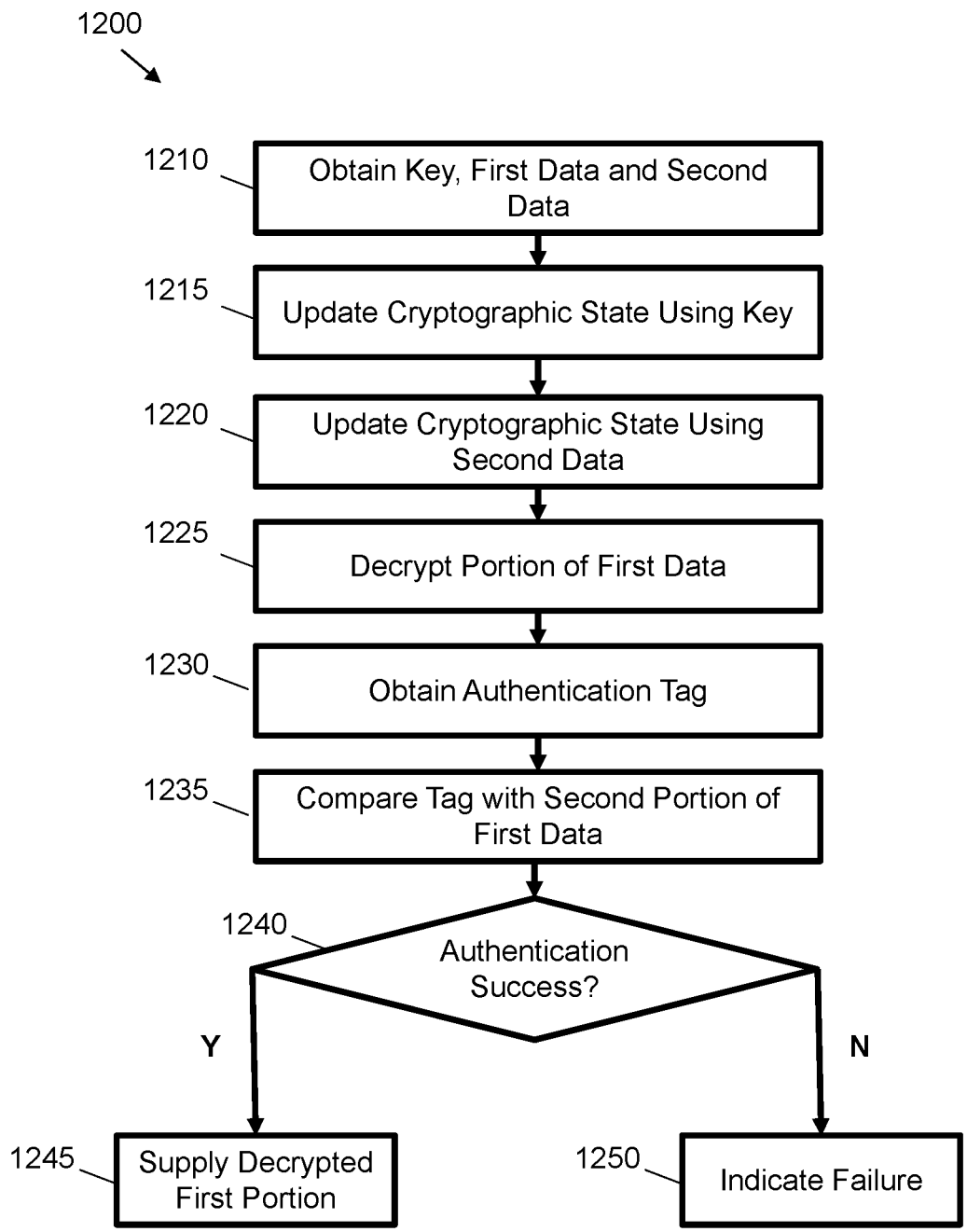
FIG. 12 is a flow diagram showing a method of decrypting electronic data according to an example.

FIG. 12 shows a method 1200 for authenticated decryption. This method 1200 may be implemented using the cryptographic system 505 of FIG. 5 or another system, e.g. comprising a processor and memory. The method 1200 may be performed by a second device following completion of the method 1100 on a first device, e.g. following transmission of the ciphertext over a communications network or within a computing architecture.

Blocks 1210 to 1230 of FIG. 12 may be seen to correspond to blocks 1110 to 1150 of FIG. 11. Similar operations may be performed. At block 1210, at least a secret key, first data comprising ciphertext and second data associated with the first data are obtained. The secret key may comprise a copy of the secret key obtained at block 1110 in FIG. 11. In certain cases, as described with reference to block 1110 of FIG. 11, the secret key may be obtained with additional data such as a nonce. The first data may comprise ciphertext as output by block 1160 of FIG. 11. The second data may comprise a copy of the second data (or the second data itself) obtained at block 1110 of FIG. 11. In certain cases, block 1210 of FIG. 12 may be performed by implementing a defined API that receives a secret key, a nonce, associated data and ciphertext.

At blocks 1215 and 1220, the cryptographic state is respectively updated using key data based on the secret key and the second data. This may be performed in a similar manner to blocks 1120 and 1130 of FIG. 11. Although, FIGS. 11 and 12 show these blocks in one order, other orders may be used in other implementations.

At block 1225 of FIG. 12, a first portion of the first data is decrypted using the cryptographic state. This may comprise a similar operation to block 1140 of FIG. 11, but with an "encrypt" function replaced with a "decrypt" function. The first portion of the first data may be selected based on a predefined length, e.g. a predefined length t-bits of the authenticated tag, where the first portion represents the first data without the last t-bits. This first portion represents the encrypted first data from block 1150 of FIG. 11. In certain cases, a common (i.e. shared) function may implement both the "encrypt" and "decrypt" functions (e.g. with a flag for differing portions). The "decrypt" function may comprise combining the encrypted first data with the cryptographic state (e.g. following the updating of blocks 1215 and 1220) on a portion-by-portion basis, where the result of the combining is read out as decrypted plaintext. Like the "encrypt" function, the "decrypt" function updates the cryptographic state. However, instead of updating the cryptographic state based on the decrypted plaintext (e.g. as would occur if the above described "encrypt" function is used), the "decrypt" function may be configured to update the cryptographic state based on the first portion of the first data, e.g. where a portion of the encrypted first data (e.g. that is being decrypted) is combined with a portion of the cryptographic state (e.g. the encrypted portion of the first data is combined, as opposed to the decrypted portion of the first data). The "decrypt" function may also be followed by a "finish" function as previously described.

Following block 1225, a decrypted set of plaintext (e.g. unencrypted binary data) is obtained. Blocks 1230 to 1250 of FIG. 12 then perform a further check to determined whether this decrypted data should be supplied, where the further check is performed with regard to the authentication tag generated at block 1150 of FIG. 11. At block 1230, an authentication tag is obtained using the cryptographic state. This may be performed in a similar manner to block 1150 of FIG. 11. However, in the present case, the authentication tag is generated using the cryptographic state that results from blocks 1215 to 1225. At block 1235, a comparison is made between the authentication tag as retrieved at block 1230 and a second portion of the first data. The second portion of the first data may comprise the last t-bits of the ciphertext output at block 1160 of FIG. 11, which represents the authentication tag generated at block 1150 of FIG. 11. Hence, the comparison at block 1235 is performed between an authentication tag generated by an encryption process and an authentication tag as generated by a decryption process. The comparison may comprise a check that the two sets of data are equal. At block 1240, a result of this comparison is processed. Responsive to the comparison indicating an authentication success, e.g. the two sets of data being equal, the decrypted first portion from block 1225 is supplied as an output of the method 1200 at block 1245. Responsive to the comparison indicating an authentication failure, e.g. the two sets of data not being equal, the decrypted first portion from block 1225 is not supplied as an output of the method 1200 and instead an authentication failure is indicated at block 1250. In this latte case, no decrypted data may be supplied. As such, the method 1200 may return one of two items of data, e.g. in response to an API call as described with reference to block 1210: the decrypted first portion (e.g. the plaintext data encrypted in the method 1100 of FIG. 11) or a "FAIL" error representing an integrity check failure.

In certain examples, per-message rekeying may be avoided by skipping blocks 1120 and/or 1215 for subsequent messages (e.g. where different data to encrypt and associated data is supplied). This may be performed by adding a "finish" operation after the authentication tag is obtained at blocks 1150 and/or 1230. This may provide an additional speed-up in certain implementations. It may also save memory and provide "forward security", as the original secret key and/or nonce do not need to be retained for subsequent messages. This may represent a lightweight "MAC-and-continue" setup (where "MAC" stands for Message Authentication Code).

Figure 13:
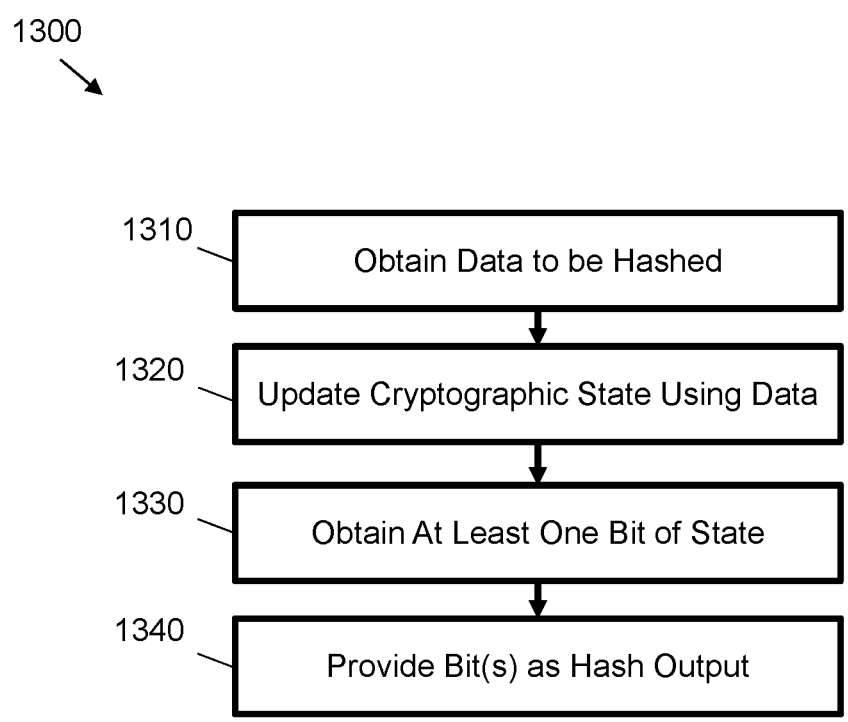
FIG. 13 is a flow diagram showing a method of hashing electronic data according to an example.

FIG. 13 shows a method 1300 of generating a cryptographic hash according to an example. This method 1300 may be implemented using the cryptographic system 605 of FIG. 6 or another system, e.g. comprising a processor and memory. The method comprises obtaining data to be hashed at block 1310, updating the cryptographic state using the data to be hashed at block 1320, obtaining at least one bit of the cryptographic state at block 1330 and providing the at least one bit as a cryptographic hash of the data to be hashed at block 1340. Block 1320 may be implemented in a similar manner to one of blocks 1120, 1130, 1215 and 1220 of FIGS. 11 and 12. Block 1330 may be implemented in a similar manner to blocks 1150 and 1230 of FIGS. 11 and 12, where the obtained at least one bit that represents a hash of the obtained data may also be seen as an authentication tag (or the authentication tag of FIGS. 11 and 12 may be seen as a form of hash of the data of the previous combined operations). The method 1300 may be implemented using "absorb" and "get" functions as described previously, with respective domain identifiers indicating a full state hash input and a hash output. In this manner, embedded devices may be equipped with a number of primitive functions that may be used to implement one or more of the methods of FIGS. 11, 12 and 13, e.g. using the method of FIG. 8 to implement one or more of the primitive functions.

In certain examples, the methods 1100, 1200 and 1300 may comprise an initial operation of initialising the cryptographic state prior to a first updating of the cryptographic state. This may comprise clearing the cryptographic state (e.g. setting the bits of the state to zero) and resetting a portion index (e.g. setting this to zero). In certain cases, such as those similar to the MAC-and-continue example described above, there may be no initialisation, e.g. the methods may be implemented as a continuing set of synchronised methods between two or more devices.

In certain examples, an "increment" utility function may be defined to increment a portion index of the cryptographic state. This function may increment a tracking index value and invoke a permutation if a limit set by a defined rate or bit-size of the cryptographic state is reached. The permutation may further be conditional on a value of a "full" bit in a domain identifier, enabling control of the permutation where desired. The domain identifier may thus be considered a set of control flags that are used through the number of primitive functions.

Figure 14:
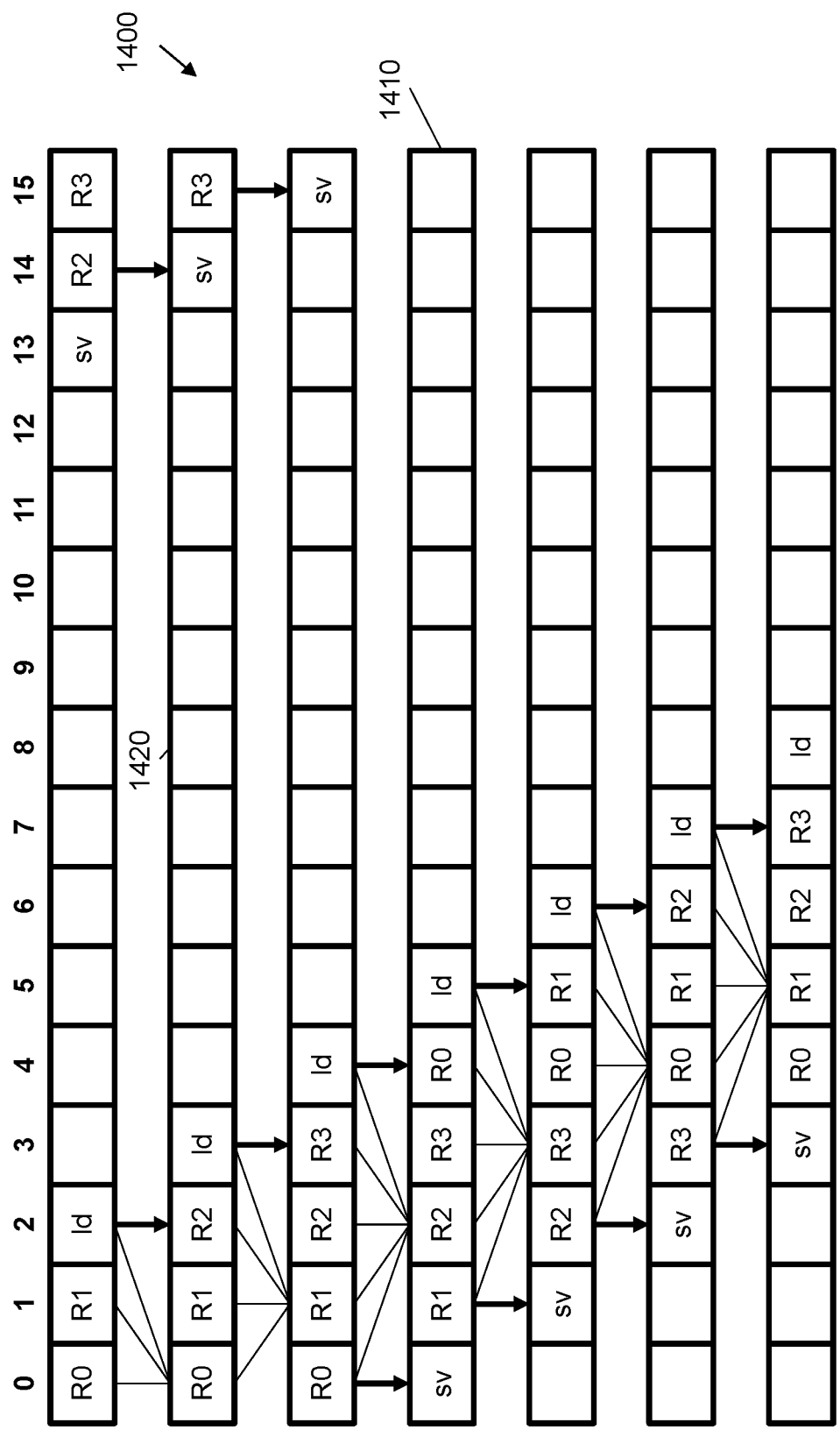
FIG. 14 is a schematic illustration showing a processing pipeline according to an example.

FIG. 14 shows an example 1400 of how a computation for a non-linear feedback shift register and/or a non-linear feedback expander sequence may be efficiently performed. FIG. 14 shows a number of rows (running from left to right across the length of the sheet), where each row represents a set of portions for the cryptographic state. In the example 1400 of FIG. 14, there are sixteen portions in the set (e.g. each portion may comprise a 32-bit word for a 512-bit cryptographic state). Hence, each row has sixteen boxes 1410 indicating a state portion from 0 to 15. Each row represents a different time during a processing sequence. The example 1400 shows a sliding window implementation that operates on five consecutive portions of the cryptographic state. These five consecutive portions are used to compute a new value for the "middle" portion in the window. FIG. 14 shows how this computation may be organised so that there is a single load ("ld") and save ("sv") operation for each processing step (e.g. as represented by a row). In this way, a set of four registers "R0", "R1", "R2" and "R3" may be used that avoids shifting values from one register to another. The processing may therefore be efficiently unrolled, e.g. by 4, 8 or 16 steps. FIG. 4 also shows how the computation "wraps around" the portions of the cryptographic state.

In FIG. 14, the second row 1420 shows how a first portion of the cryptographic state—s[0]—may be updated using a window of five values from portions 4[4](i.e. s[i−2]), s[15] (i.e. s[i−1]), s4[0] (i.e. s[i]), s[1] (i.e. s[i+1]) and s[2] (i.e. s[+2]). In the first row, s[0] is present in register R0, s[1] is present in register R1, s[14] is present in register R2 and s[15] is present in register R3. To compute an updated value for s[0], s[2] is loaded in the first row, and then is stored in register R2 after the computation is complete. The portion s[2] may be loaded into register R2, as the portion s[14] is not required for the computation of the third row as the sliding window shifts right along the portions. The value stored in register R2 in the first row, may be saved before the computation of the second row, e.g. for use in later computations when the leading edge of the sliding window reaches portion s[14] (which will occur in future rows that are not shown). This pattern continues as the sliding window is shifted right and each of the portions of the cryptographic state are updated in turn. As may be seen, each computation, as set out in the rows, comprises a save operation, use of four registers and a load operation. In effect, a replacement value representing the leading edge of the sliding window is loaded following use of the trailing edge in the previous computation. This may be used to unroll computation in multiples of four (for a sliding window of width five). Using this method in test implementations, permutations with eight rounds may be computed with around 1000 clock cycles per round on 8-bit microcontrollers and around 200 cycles per round on 32-bit microcontrollers, with more time being saved the more computations are unrolled.

Certain examples herein may be implemented by a number of different instruction set architectures (ISAs), which may operate on different underlying hardware, such as a SOC, an ASIC and/or a set of configured FPGAs such as microcontrollers. Different ISAs tend to offer different advantages and benefits depending on the use case, and examples herein may perform more efficiently one some ISAs than on others. Factors influencing performance include, for example, whether a respective base instruction set of a particular ISA supports each of the required operations (i.e. ARX instructions), so that operations can be performed in as few clock cycles as possible. Where an operation is not directly supported by an instruction, it may need to be performed by plural instructions executing plural operations, thereby increasing the number of clock cycles and potentially being slower and less energy efficient.

Certain examples may be performed using an ISA that does not support each of the required operations (i.e. ARX instructions) by providing an instruction set extension (ISE) to make available new instructions that provide a relatively more efficient way to perform certain operations. By doing so, according to the present examples, it may be possible to perform the non-linear shift register operation in a few ISE instructions (e.g. 2 ISE instructions) rather than by having to use dozens of base instructions (e.g. more than 30 base instructions). The logic diagram 1500 in FIG. 15 reproduces the non-linear shift register of FIG. 2 (according to the variant including the left rotation unit 243), and illustrates two new instructions, referred to as ISEa 1510 and ISEb 1520, which can perform the associated non-linear feedback shift register operation. In an example, each new instruction, ISEa 1510 and ISEb 1520, operates using three source operands, illustrated in FIG. 15, respectively, as rs1a, rs2a, rs3a and rs1b, rs2b and rs3b. Three source operands are commonly available on 32-bit architectures. Nevertheless, the instructions may also be deployed using only two source operands, for instance on eight or 16 bit architectures, albeit with the slightly increased overhead (i.e. of two ADD instructions per instruction operation).

Of the source operands for the first new instruction, ISEa 1510: rs1a takes the 32-bit value from sub-register 206; rs2a takes the 32-bit value representing an XOR of the domain identifier d[i] and the 32-bit value from sub-register 214; and, rs3a takes the 32-bit value from sub-register 204.

Of the source operands for the second new instruction, ISEb 1520: rs1b takes the 32-bit value from sub-register 212; rs2a takes 32-bit value from sub-register 210; and, rs3b takes the 32-bit value representing the output of the first new instruction, ISEa 1510.

It is also possible to adapt the instructions, ISEa 1510 and ISEb 1520, for a 64-bit architecture, in which two full instruction operations can be expressed as a single, three source operand, instruction. In effect, in a 64-bit architecture, both ISEa 1510 and ISEb 1520 can be performed using two pairs of ISEa and ISEb instructions. In such an implementation, instruction count may be decreased significantly compared to a 32-bit architecture, for instance by a factor or four, and the shift registers required to hold the state may be reduced from 16 to eight.

FIG. 16A shows in tabular form 1600 an exemplary instruction set and respective bit locations for the ISEa and ISEb instructions. The values across the top of the table relate to the bit ranges (e.g. 14:12 indicates bits 12 (low bit) to 14 (high bit)) and the values in the table are 32-bit instructions in an RV32I implementation. The table shows the encoding of each instruction and how to translate it into bits. The leftmost bits (0:6), which have the value 0001011, represent the "Custom-0" major opcode, though the value for this in practice may be varied.

Figure 15:
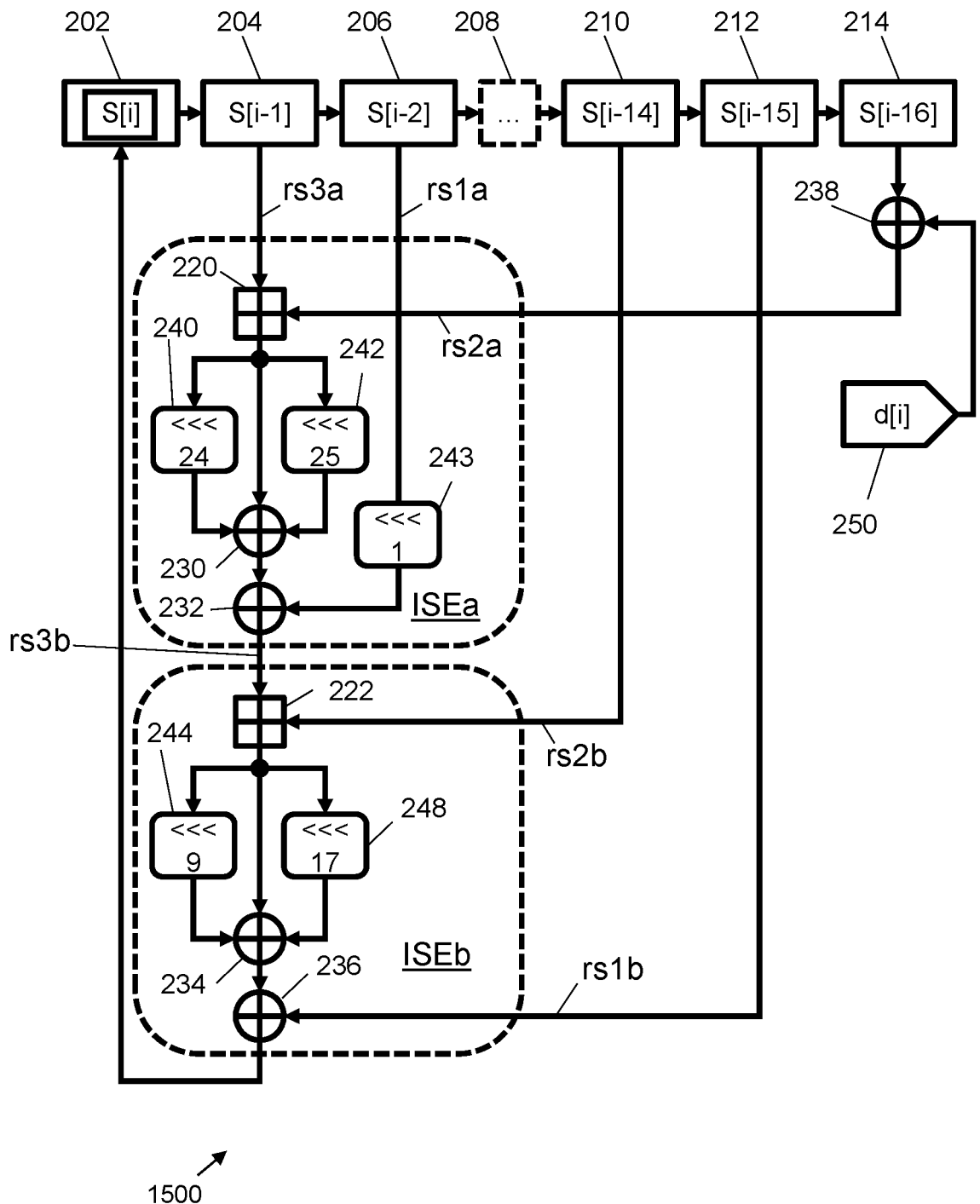
FIG. 15 is another logic diagram showing a non-linear feedback shift register according to an example.

FIG. 16B shows example pseudo code 1610 for a hardware description language, such as Verilog, suitable for realising the new instructions. In this pseudo code, the 'wire' declarations represent (in certain examples) a 32-bit value derived without intrinsic delay from one or more digital components, for example as shown in FIG. 15, for each of the new instructions. More particularly, with reference to the pseudo code in FIG. 16B, the first wire declaration declares t_w as a w-bit modulo addition of operands rs2_w and rs3_w (in the present example w=32 bits). The second wire declaration declares isea_w (representing the new instruction ISEa) as a 32-bit value representing XOR (t_w rotated left by 24 bits, t_w rotated left by 25 bits, rs1_w rotated left by 1 bit), where t_w is a 32-bit value representing a modulo addition of operands rs2a and rs3a. The third wire declaration declares iseb_w (representing the second new instruction ISEb) as a 32-bit value representing XOR (t_w, t_w rotated left by 9 bits, t_w rotated left by 17 bits, rs1b), where t_w is a 32-bit value representing a modulo addition of operands rs2b and rs3b.

In the pseudo code 1610 in FIG. 16B, a left n-bit rotation is performed by bit combining an n-bit left-shifted version of the 32-bit word with a (32-n)-bit right shifted version of the 32-bit word. As illustrated in FIG. 16C, an n-bit word 1620 (in this instance a 16-bit word—bits 0 to 15—rather than a 32 bit word is used for convenience) can be left rotated by 5 bits (illustrated as bits 0 to 4), resulting in modified word 1630. According to examples herein, an equivalent to bit rotation is performed (in an example requiring an effective 5 bit left rotation) using a 5 bit left-shifted version of the word 1640 combined with a 16−5=11 bit right-shifted version of the word 1650. As can be seen, the resulting combination or merger of the two resulting versions 1640 and 1650, which is the equivalent of a concatenation of versions 1640 and 1650 (ignoring empty bit locations) is the same as the left rotated version 1630. The notation in the pseudo code 1610 of FIG. 16B reflects this process. For example, "{t_w [7:0], t_w [31:8]}" means that bits 7 to 0 of a respective word are concatenated with bits 31 to 8 of the word. In other words, bit 8 of the word moves to the rightmost position, 0, which equates to an 8 bit right rotation or, equivalently, to a 32−8=24 bit left rotation. That is "{t_w[7:0], t_w[31:8]}" represents a 24-bit left shift and an 8-bit right shift concatenated to deliver a 24-bit left rotation.

Certain examples described herein provide a lightweight permutation implementation that may provide a basis for different permutation-based primitive functions. These primitive functions may in turn form the basis for a variety of cryptographic systems and methods, including authentication encryption/decryption, hashing, seed expansion and random number generation. Certain examples described herein may be implemented on off-the-shelf 8, 16 or 32-bit embedded microcontrollers, and/or may be embodied in dedicated circuitry such as cryptographic chips for embedded and mobile computing devices.

Certain examples described herein provide flexible permutation, where a size of the permutation (e.g. a number of portions of a cryptographic state that are permutated) may be configured to be various values, allowing smaller and larger permutations to be constructed depending on the implementation. Dividing a cryptographic state into portions may enable the permutation state (e.g. the portions that are permutated) to fit into available register space. A sliding window approach, as described in examples herein, may localise processing to enable computation on processing devices with limited resources. Certain examples described herein may also be implemented while avoiding table look-ups or conditional branches. This makes the examples resistant to timing attacks, as well as other simple side-channel attacks.

Certain examples described herein provide efficient mixing by taking advantage of immediate feedback between portions of the cryptographic state. This helps to rapidly diffuse the cryptographic state, where certain examples may achieve a complete avalanche (i.e. where each input bit affects each output bit) in two or more rounds of permutation. A high level of security may be provided using feedback diffusion in multiple directions (e.g. backwards and forwards among the portions of the cryptographic state). For example, the non-linear feedback shift expander sequence 900 shown in FIG. 9A has steps that are invertible. In the specific examples of FIGS. 2 and 9A, while the rotation values may be changed, the example values of 24, 25, 9 and 17 enable implementation on microcontrollers that only provide instructions for single-bit rotation of bytes.

Certain examples described herein, may be faster to compute and require much less read-only memory than comparative cryptographic solutions. For example, in tests, computation time was decreased by a factor of 3 to 6 on 8-bit microcontrollers with up to a factor of 10 reduction in read-only memory requirements. In certain test implementations, random-access memory use was also reduced, with certain implementations only requiring 64 bytes of random-access memory to perform the permutation. Certain examples also enable trade-offs to be configured between at least desired security, confidentiality, integrity, rate, cryptographic state size, number of rounds, number of portions that are permutated and key size. The examples are able to operate with no explicit limits on input data sizes, e.g. the sizes of a hashed message, plaintext, associated data, or secret key.

Certain system components and methods described herein may be implemented by way of computer program code that is storable on a non-transitory storage medium, e.g. as described with reference to FIG. 7. The above examples are to be understood as illustrative. Further examples are envisaged. For example, specific values discussed herein are based on test examples and may vary depending on implementation (e.g. depending on microcontroller specifications and type, on security requirements and other factors). Although certain components of each example have been separately described, it is to be understood that functionality described with reference to one example may be suitably implemented in another example, and that certain components may be omitted depending on the implementation. It is to be understood that any feature described in relation to any one example may be used alone, or in combination with other features described, and may also be used in combination with one or more features of any other of the examples, or any combination of any other of the examples. For example, features described with respect to the system components may also be adapted to be performed as part of the described methods. Furthermore, equivalents and modifications not described above may also be employed without departing from the scope of the invention, which is defined in the accompanying claims.

What is claimed is:

1. Apparatus for permutating electronic data, the apparatus comprising:
   an input interface to receive at least a cryptographic state, the cryptographic state comprising a plurality of bits;
   circuitry configured to function as a non-linear feedback shift register, the non-linear feedback shift register comprising a plurality of stages to receive the cryptographic state, the non-linear feedback shift register updating at least one of the plurality of stages as a non-linear function of at least one or more other stages in the plurality of stages;
   a permutation engine to control the circuitry configured to function as a non-linear feedback shift register to apply the non-linear feedback shift register to the cryptographic state over a plurality of rounds to update the cryptographic state; and
   an output interface to output the cryptographic state as updated by the permutation engine over the plurality of rounds.

2. The apparatus of claim 1, wherein the circuitry configured to function as a non-linear feedback shift register is configured to update at least one of the plurality of stages as a non-linear function of one or more preceding stages in the plurality of stages and one or more succeeding stages in the plurality of stages.

3. The apparatus of claim 1, wherein the input interface is configured to receive a domain identifier and the permutation engine is configured to apply the domain identifier to the cryptographic state to update the cryptographic state, wherein the permutation engine is configured to modify the cryptographic state during each round using the domain identifier.

4. The apparatus of claim 1, wherein the circuitry configured to function as a non-linear feedback shill register is configured to iteratively update each of the plurality of stages during each round to update the cryptographic state.

5. The apparatus of claim 1, comprising circuitry to return a round constant from a plurality of round constants, wherein the permutation engine is configured to modify the cryptographic state for each round using a different round constant from the circuitry.

6. The apparatus of claim 1, wherein each of the plurality of stages has a width in bits that is determined based on a word-length of the apparatus, the word-length in bits being less than the plurality of bits of the cryptographic state.

7. The apparatus of claim 1, wherein each of the plurality of stages has a width of w-bits and the circuitry configured to function as a non-linear feedback shift register is configured to implement the non-linear function using:

an addition modulo w-bits between two w-bit data values;
a bitwise exclusive-or operation between two w-bit data values; and
a cyclic left rotation by r-bits of an w-bit data value.

8. The apparatus of claim 1, wherein the circuitry configured to function as a non-linear feedback shift register is configured to:
apply a first function to a set of bits for a first preceding stage and a set of bits for a first succeeding stage;
cyclically rotate an output of the first function; and
update a set of bits for a current stage based on the cyclically-rotated output of the first function.

9. The apparatus of claim 8, wherein the circuitry configured to function as a non-linear feedback shift register is configured to prior to updating the set of bits for a current stage:
apply a second function to a set of bits from the cyclically-rotated output of the first function and data derived from a set of bits for a second succeeding stage, the set of bits for a second succeeding stage having optionally been cyclically rotated;
cyclically rotate an output of the second function,
wherein the circuitry configured to function as a non-linear feedback shift register is configured to update the set of bits for a current stage based on the cyclically-rotated output of the second function, and
wherein the circuitry configured to function as a non-linear feedback shift register is configured to:
apply a third function to the cyclically-rotated output of the first function and a set of bits for a second preceding stage before applying the second function; and
apply a fourth function to the cyclically-rotated output of the second function and a set of bits for a third preceding stage to update the set of bits for the current stage.

10. The apparatus of claim 1, comprising:
a set of registers to store one or more computation results from the circuitry configured to function as a non-linear feedback shift register during a round, wherein the circuitry configured to function as a non-linear feedback shift register loads the one or more computation results from the set of registers in a subsequent round.

11. The apparatus of claim 1, wherein the circuitry configured to function as a non-linear feedback shift register comprises the plurality of stages each comprise w-bits and the circuitry configured to function as anon-linear feedback shift register is configured to update the at least one of the plurality of stages as a non-linear function of at least one or more other stages in the plurality of stages using at least a cyclic rotation by r-bits of an w-bit data value, wherein cyclic rotation by r-bits is performed by a combination of instructions comprising left shift, right shift and bit combination operations.

12. The apparatus of claim 11, wherein the apparatus comprises a RISC core and wherein each round of the non-linear feedback shift register is performed by two instructions in the instruction set extension, each instruction comprising bit combination, exclusive-or, left shift and right shift operations.

13. The apparatus according to claim 12, wherein the two instructions each operate using three operands.

14. A method of updating a cryptographic state, the method comprising:
obtaining a cryptographic state, the cryptographic state comprising a plurality of bits;
for a predefined number of rounds:
applying a round constant to the cryptographic state, the round constant being specific to a current round, and
implementing a non-linear feedback shift expander sequence using the plurality of bits of the cryptographic state to update the cryptographic state for the current round, the cryptographic state following the non-linear feedback shift expander sequence being used as an input for a next round; and
outputting the updated cryptographic state following the predefined number of rounds.

15. The method of claim 14, comprising:
obtaining a domain identifier, the domain identifier indicating one of a plurality of different update operations; and
in each round, applying a domain constant to the cryptographic state, the domain constant being determined based on the domain identifier.

16. The method of claim 14, wherein implementing a non-linear feedback shift expander sequence comprises:
accessing the plurality of bits of the cryptographic state as a plurality of words, each word comprising a set of w-bits;
for at least one word in the plurality of words:
updating the word as a non-linear function of one or more preceding words in the plurality of words and one or more succeeding words in the plurality of words
wherein each word in the plurality of words is updated to update the cryptographic state.

17. The method of claim 14, wherein implementing the non-linear feedback shift expander sequence comprises:
applying at least one addition operation;
applying at least one exclusive-or operation; and
applying at least one cyclical rotate operation,
the operations being applied to subsets of the plurality of bits of the cryptographic state.

18. The method of claim 14, wherein the non-linear feedback shift register applies at least one addition operation, at least one exclusive-or operation and at least one cyclical rotate operation, the cyclical rotate operation being implemented by instructions comprising a combination of left shift, right shift and bit combination operations, the operations being applied to subsets of the plurality of bits of the cryptographic state.

19. The method of claim 18, wherein each round of the non-linear feedback shift register is performed by two instructions in the instruction set extension, each instruction comprising addition, exclusive-or, left shift and right shift operations
wherein the two instructions each operate using three operands.

20. A non-transitory computer-readable storage medium storing instructions that, when executed by a processor, cause the processor to:
obtain a cryptographic state, the cryptographic state comprising a plurality of bits;
for a predefined number of rounds:
apply a round constant to the cryptographic state, the round constant being specific to a current round, and
implement a non-linear feedback shift expander sequence using the plurality of bits of the cryptographic state to update the cryptographic state for the current round, the cryptographic state following the non-linear feedback shift expander sequence being used as an input for a next round; and output the updated cryptographic state following the predefined number of rounds.

\* \* \* \* \*